United States Patent
O'Leary et al.

(10) Patent No.: US 9,242,267 B2
(45) Date of Patent: Jan. 26, 2016

(54) METHOD AND APPARATUS FOR MIXING AND APPLYING MATERIAL

(71) Applicant: Owens Corning Intellectual Capital, LLC, Toledo, OH (US)

(72) Inventors: Robert J. O'Leary, Newark, OH (US); Christopher Relyea, Marysville, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 13/755,057

(22) Filed: Jan. 31, 2013

(65) Prior Publication Data

US 2014/0209630 A1 Jul. 31, 2014

(51) Int. Cl.
| | |
|---|---|
| *B05C 11/10* | (2006.01) |
| *B05C 5/00* | (2006.01) |
| *B05C 17/005* | (2006.01) |
| *B05C 5/02* | (2006.01) |
| *E04F 21/165* | (2006.01) |

(52) U.S. Cl.
CPC ......... *B05C 17/00566* (2013.01); *B05C 5/0212* (2013.01); *B05C 11/1036* (2013.01); *B05C 17/00516* (2013.01); *E04F 21/165* (2013.01)

(58) Field of Classification Search
CPC .. B05C 11/1036; B05C 5/0212; E04F 21/165
USPC .............. 118/300, 684, 692; 222/145.2, 105; 222/145.5; 134/22.12
See application file for complete search history.

(56) References Cited

U.S. PATENT DOCUMENTS

| | | | |
|---|---|---|---|
| 2,052,622 A | 9/1936 | Hale | |
| 3,690,557 A | 9/1972 | Higgins | |
| 3,907,207 A | 9/1975 | O'Brien | |
| 4,074,363 A | 2/1978 | Croft | |
| 4,202,497 A | 5/1980 | Ten Pas | |
| 4,234,007 A | 11/1980 | Titone et al. | |
| 4,256,261 A | 3/1981 | Gurner | |
| 4,263,166 A | 4/1981 | Adams | |
| 4,317,647 A * | 3/1982 | Hauser | 417/339 |
| 4,376,512 A | 3/1983 | Kistner | |
| 4,428,530 A | 1/1984 | Chabria | |
| 4,471,887 A | 9/1984 | Decker | |
| 4,534,802 A * | 8/1985 | Gates et al. | 134/22.12 |
| 4,549,676 A | 10/1985 | Gerich | |
| 4,745,011 A | 5/1988 | Fukuta et al. | |
| 4,789,100 A * | 12/1988 | Senf | 239/61 |
| 4,857,367 A * | 8/1989 | Thorn et al. | 427/348 |
| 4,925,107 A | 5/1990 | Brown | |
| 4,993,596 A | 2/1991 | Brown | |
| 5,005,765 A | 4/1991 | Kistner | |
| 5,086,949 A | 2/1992 | Vulpitta et al. | |

(Continued)

*Primary Examiner* — Yewebdar Tadesse
(74) *Attorney, Agent, or Firm* — Calfee, Halter & Griswold LLP

(57) ABSTRACT

Methods and apparatus for mixing and applying a bead of material. For example, the bead of material can be used to seal gaps cracks and seams of a building. The apparatus includes a supply machine and an applicator. The supply machine provides each of the parts of the material to the applicator at a controlled rate. The applicator mixes the parts of the material at a nozzle. The applicator provides a bead (rather than spraying) of the mixed material through the nozzle. The bead of material may be applied in a precise manner to seal gaps, cracks and seams of an existing building and/or the bead may be provided during new construction of a building between components of the building.

16 Claims, 40 Drawing Sheets

(56) References Cited

U.S. PATENT DOCUMENTS

| | | |
|---|---|---|
| 5,163,584 A | 11/1992 | Huber et al. |
| 5,180,082 A | 1/1993 | Cherfane |
| 5,242,115 A | 9/1993 | Brown |
| 5,246,143 A | 9/1993 | Cherfane |
| 5,265,761 A | 11/1993 | Brown |
| 5,271,521 A | 12/1993 | Noss et al. |
| 5,332,125 A | 7/1994 | Schmitkons et al. |
| 5,348,230 A | 9/1994 | Mullen et al. |
| 5,348,392 A | 9/1994 | Bouquet et al. |
| 5,381,962 A | 1/1995 | Teague |
| 5,429,308 A | 7/1995 | Brown |
| 5,462,204 A | 10/1995 | Finn |
| 5,590,816 A | 1/1997 | Bertram et al. |
| 5,614,563 A | 3/1997 | Ishida et al. |
| 5,709,317 A | 1/1998 | Bertram et al. |
| 5,899,362 A | 5/1999 | Moran |
| 5,950,875 A | 9/1999 | Lee et al. |
| 6,105,822 A | 8/2000 | Larsen et al. |
| 6,138,872 A | 10/2000 | Brennan et al. |
| 6,161,725 A | 12/2000 | Dean |
| 6,182,868 B1 | 2/2001 | Hurray et al. |
| 6,220,747 B1 * | 4/2001 | Gosselin .................... 366/152.3 |
| 6,283,221 B2 | 9/2001 | Hurray et al. |
| 6,283,329 B1 | 9/2001 | Bezaire et al. |
| 6,296,146 B2 | 10/2001 | Dean |
| 6,315,161 B1 | 11/2001 | Bezaire et al. |
| 6,345,776 B1 | 2/2002 | Hurray et al. |
| 6,533,189 B2 * | 3/2003 | Kott et al. ......................... 239/8 |
| 6,533,195 B2 | 3/2003 | Sinders |
| 6,564,973 B1 | 5/2003 | Brown et al. |
| 6,619,569 B2 | 9/2003 | Jens |
| 6,691,898 B2 | 2/2004 | Hurray et al. |
| 6,824,071 B1 | 11/2004 | McMichael |
| 6,840,462 B2 | 1/2005 | Hurray et al. |
| 6,879,876 B2 | 4/2005 | O'Dougherty et al. |
| 7,306,171 B2 | 12/2007 | Weinberger et al. |
| 7,377,404 B2 | 5/2008 | Cherfane |
| 7,664,568 B2 | 2/2010 | O'Dougherty et al. |
| 7,702,418 B2 | 4/2010 | O'Dougherty et al. |
| 7,717,357 B2 | 5/2010 | Gantenbein et al. |
| 7,747,344 B2 | 6/2010 | O'Dougherty et al. |
| 7,918,369 B2 | 4/2011 | Kosmyna et al. |
| 7,954,673 B2 | 6/2011 | Kosmyna et al. |
| 8,056,835 B2 | 11/2011 | Helleson |
| 8,118,052 B2 | 2/2012 | Swab et al. |
| 8,123,081 B2 | 2/2012 | Swab et al. |
| 8,140,184 B2 | 3/2012 | Chen et al. |
| 8,150,549 B2 | 4/2012 | O'Dougherty et al. |
| 8,240,508 B2 | 8/2012 | Wegelin et al. |
| 8,261,780 B2 | 9/2012 | Thomas et al. |
| 2005/0035153 A1 | 2/2005 | Brown |
| 2011/0031270 A1* | 2/2011 | Choiniere et al. ................ 222/1 |
| 2011/0062702 A1 | 3/2011 | Pellin et al. |
| 2011/0121034 A1 | 5/2011 | Swab et al. |
| 2012/0187145 A1* | 7/2012 | Gould et al. ...................... 222/1 |
| 2013/0020410 A1 | 1/2013 | Conrad |

* cited by examiner

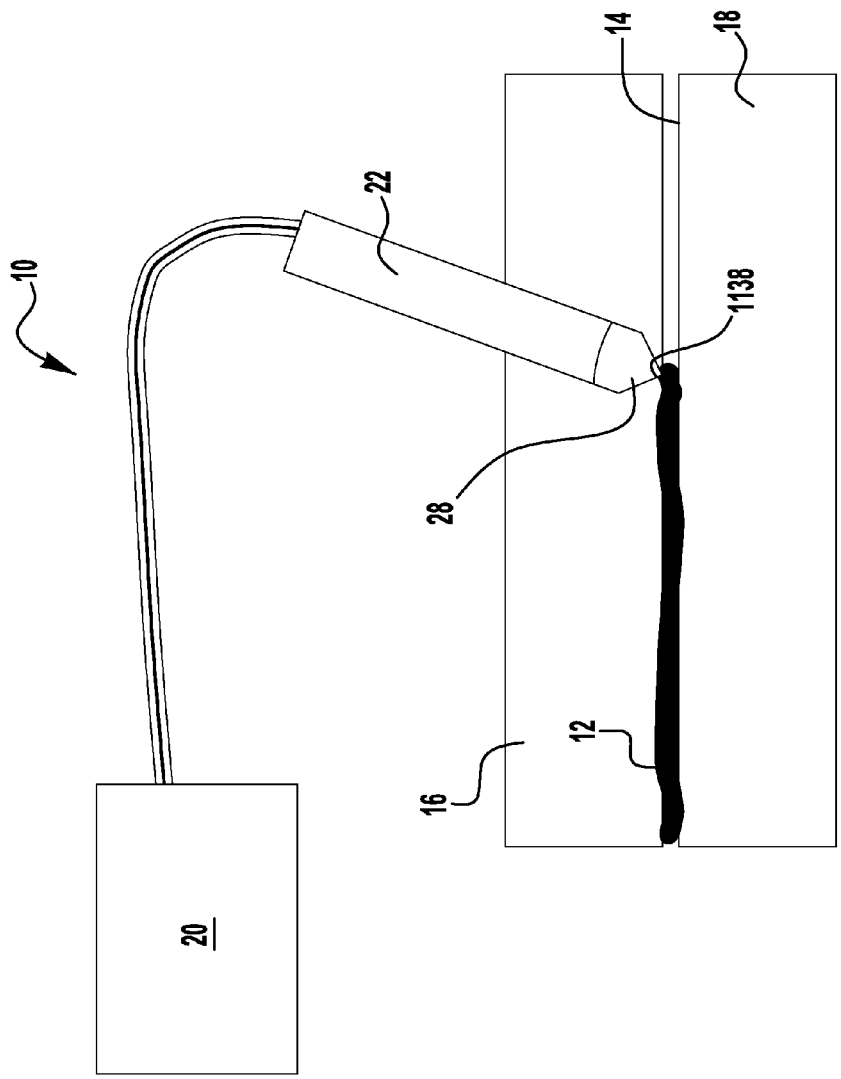

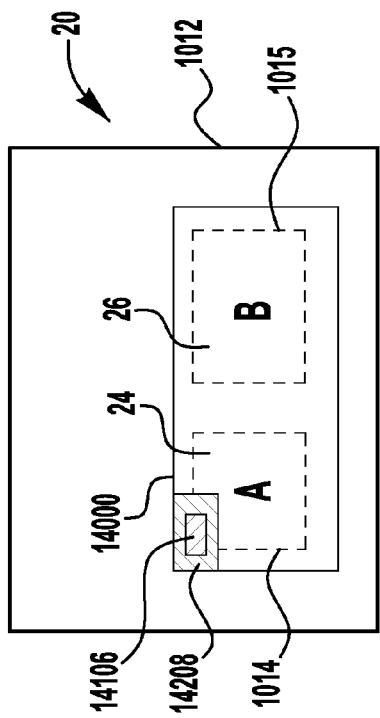
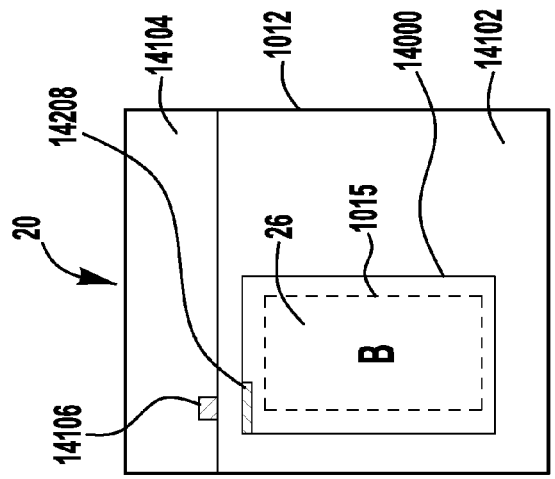
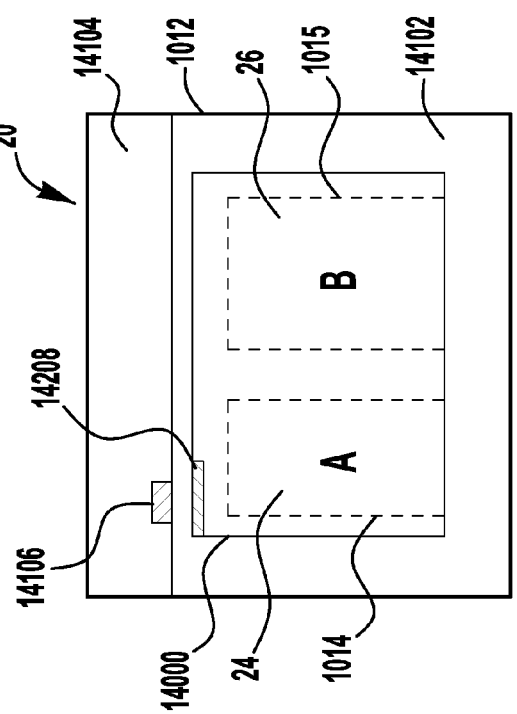

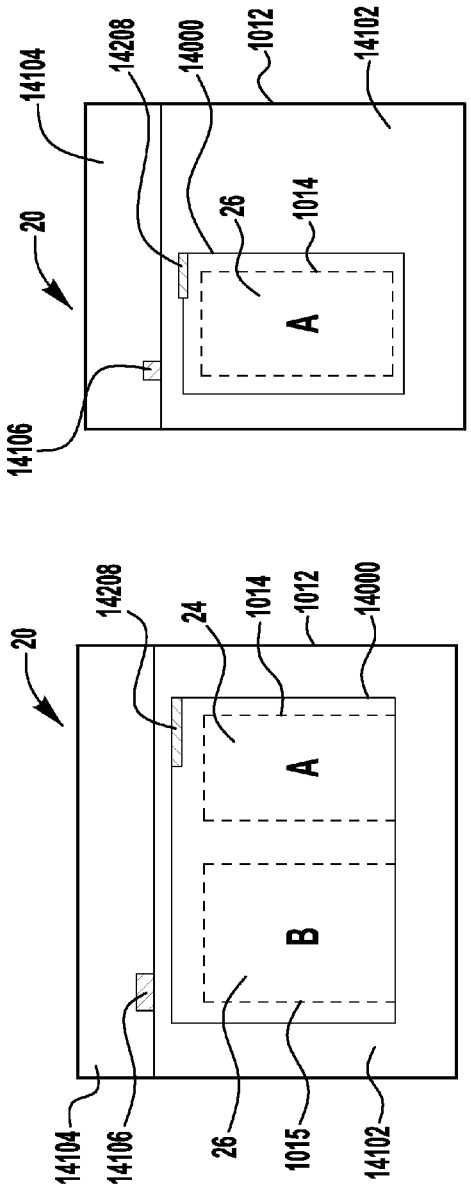
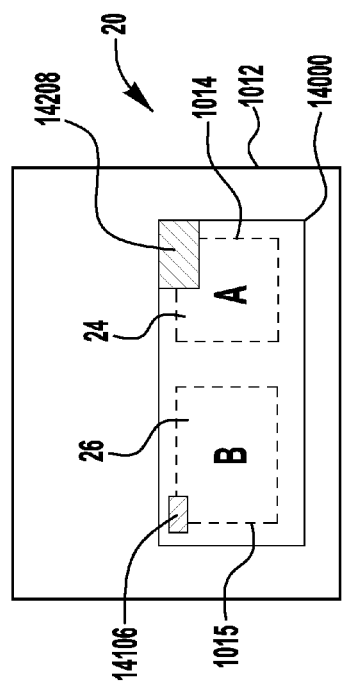
FIG. 15A
FIG. 15B
FIG. 15C

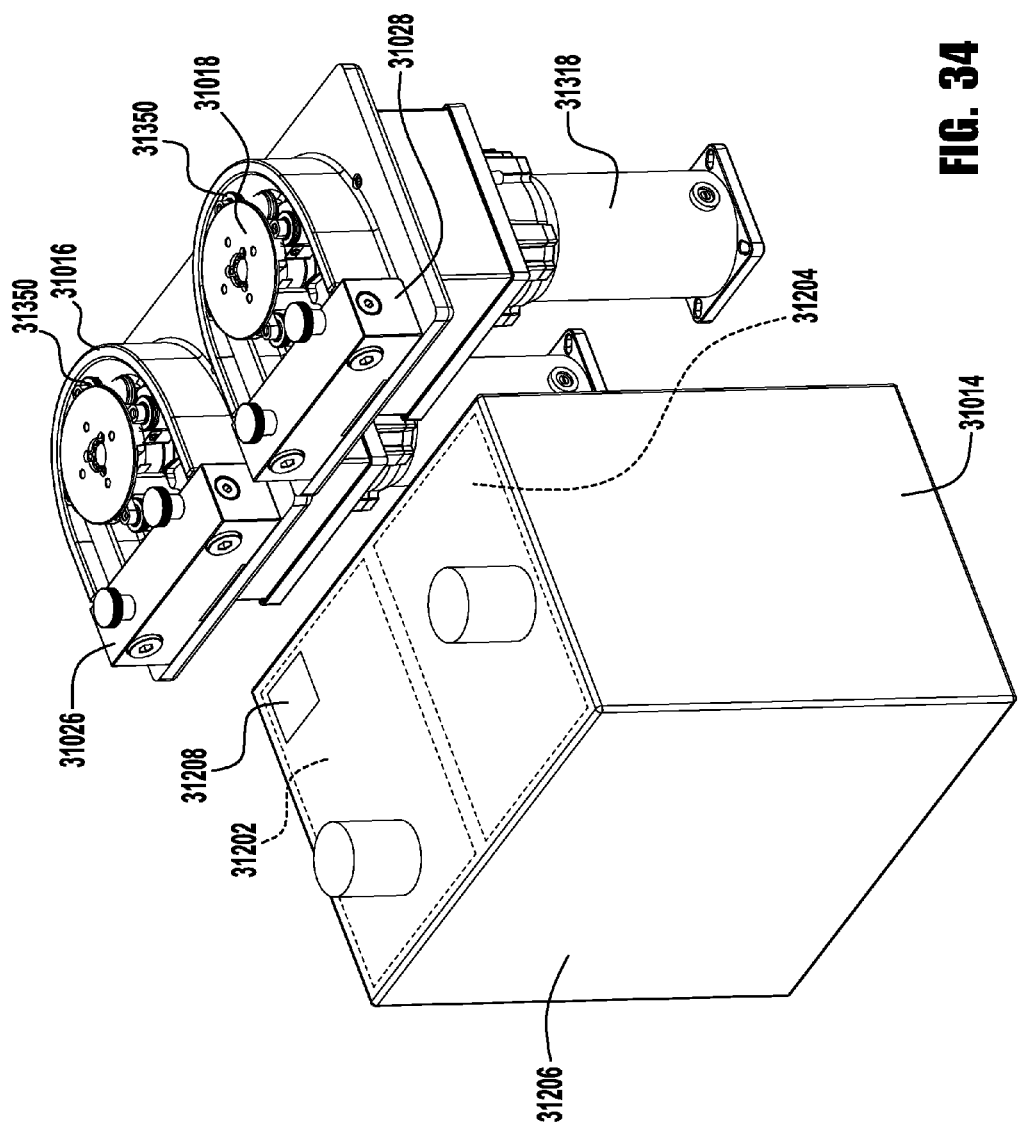

METHOD AND APPARATUS FOR MIXING AND APPLYING MATERIAL

FIELD OF THE INVENTION

Various embodiments of methods and apparatus for mixing and applying a bead of material are described herein.

BACKGROUND OF THE INVENTION

Buildings, such as houses, commercial buildings, and industrial buildings, are insulated to reduce the amount of energy required o heat or cool the building. Buildings may have gaps, cracks and seams where air can enter and escape. These leaks can decrease the overall comfort of a building by allowing unwanted moisture, drafts and noise to penetrate the building, and can significantly increase the amount of energy needed to heat or cool the building. Spray foam is one type of insulation that is used to insulate buildings. The foam is applied to a nozzle at a high pressure, such that the foam is sprayed away from the nozzle. This spraying allows the foam to be applied to large surfaces and spaces. Spray foam expands to coat and seal several types of surfaces and cracks. For example, spray foam can be used to fill voids and gaps between framing members and exterior sheathing.

SUMMARY OF THE INVENTION

The present application describes various embodiments of methods and apparatus for mixing and applying a bead of material. For example, the bead of material can be used to seal gaps cracks and seams of a building. The apparatus includes a supply machine and an applicator. The supply machine provides each of the parts of the material to the applicator at a controlled rate. The applicator mixes the parts of the material at a nozzle. The applicator provides a bead (rather than spraying) of the mixed material through the nozzle. The bead of material may be applied in a precise manner to seal gaps, cracks and seams of an existing building and/or the bead may be provided during new construction of a building between components of the building.

Other advantages of the method and apparatus will become apparent to those skilled in the art from the following detailed description, when read in view of the accompanying drawings.

BRIEF DESCRIPTION OF THE DRAWINGS

FIG. 1A is a schematic illustration of an apparatus applying a bead of material;

FIGS. 14A-14C schematically illustrate an exemplary embodiment of a material supply machine with material containers installed in a correct orientation;

FIGS. 15A-15C schematically illustrate an exemplary embodiment of a material supply machine with material containers installed in an incorrect orientation;

FIG. 34 is a perspective view of the material container and pumps illustrated by FIG. 33;

DETAILED DESCRIPTION OF THE INVENTION

Figure 1:
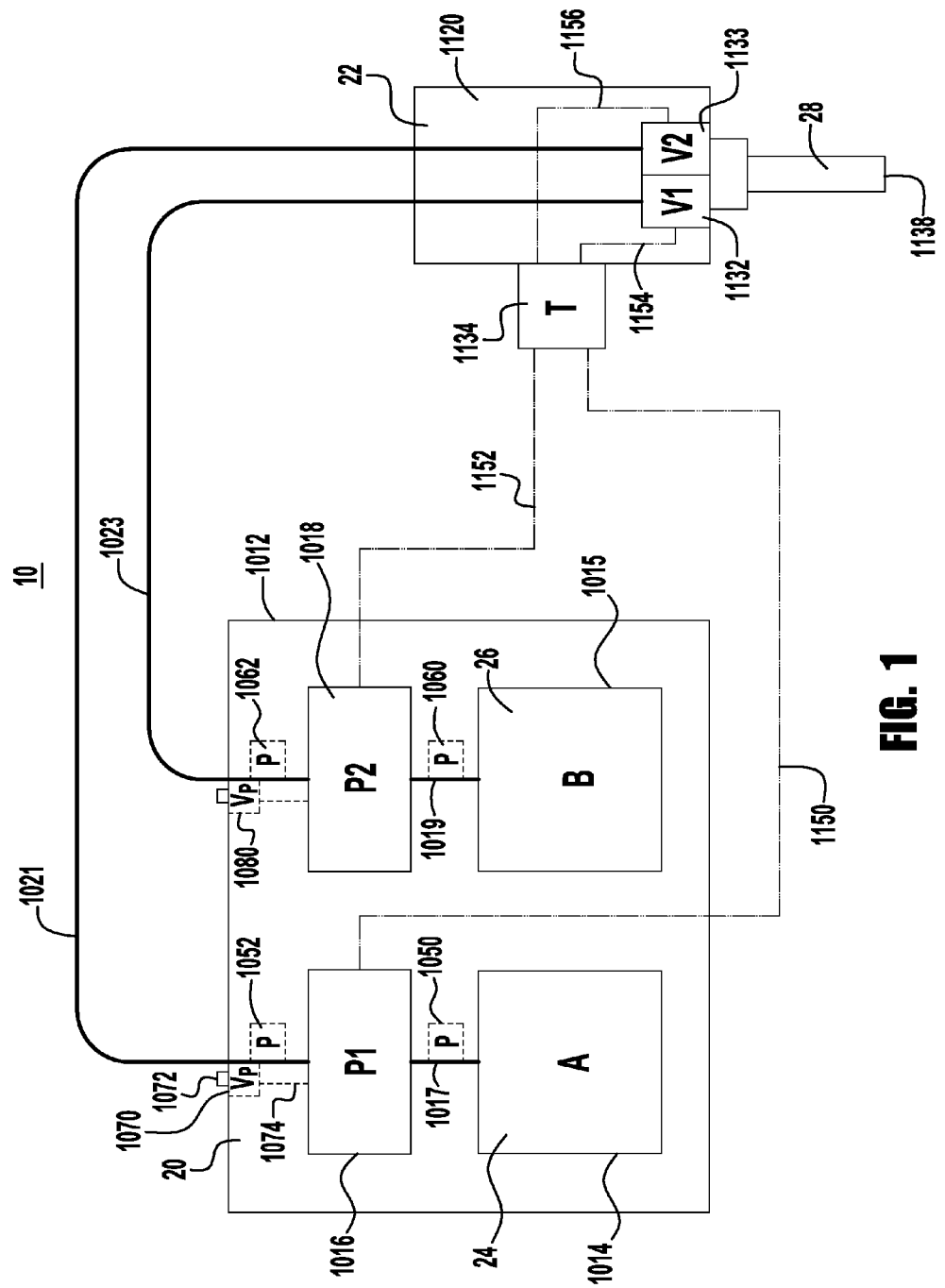
FIG. 1 is a schematic illustration of an exemplary embodiment of an apparatus for mixing and applying a bead of material.

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular fauns "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

FIG. 1A schematically illustrates an exemplary embodiment of an apparatus 10 for mixing and applying a bead 12 of material. In the example illustrated by FIG. 1A, the bead 12 seals a gap, crack, and/or seam 14 of a building (schematically illustrated by blocks 16, 18). For example, the gap, crack, and/or seam 14 may be between a foundation and a frame member, between an interior wall board, such as drywall, and a frame member, such as a vertically oriented stud, a horizontally oriented top frame member, or a horizontally oriented bottom frame member, between an exterior wall board, such as oriented strand board, and a frame member, such as a vertically oriented stud, a horizontally oriented top frame member, or a horizontally oriented bottom frame member, between a floor board and an interior or exterior wall board, between a ceiling panel and an interior or exterior wall board, between or along seams between interior or exterior wall boards, between or along seams between roof deck boards, etc. The bead 12 may seal any gap, crack, and/or seam 14 of a building.

The apparatus includes a supply machine 20 and an applicator 22. The supply machine provides each of the parts 24, 26 of the material to the applicator 22 at a controlled rate. A material made by dispensing two parts is illustrated. However, the material may be formed by mixing any number of parts. In an exemplary embodiment, the applicator 22 mixes the parts 24, 26 of the material at a nozzle 28. In an exemplary embodiment, the applicator provides a bead 12 (see FIG. 1A) rather than spraying of the mixed material through the nozzle 28. In this application, a "bead" is a continuous line of material. By way of contrast, material that is "sprayed" separates and is projected away from other material at the nozzle. In an exemplary embodiment, the bead 12 is not "sprayed" by the nozzle 28. A width of the bead may be controlled by adjusting a flow rate at which the material is applied and by adjusting a speed at which the applicator 22 is moved along the surface the bead is being applied to. The bead 12 of material may be applied in a precise manner to seal gaps, cracks and seams 14 of an existing building and/or the bead may be provided during new construction of a building between components of the building.

The apparatus 10 may be used to apply a bead 12 of a wide variety of different materials. For example, the apparatus 10 may be configured to mix two or more adhesive and/or sealant parts and apply a bead of the mixed adhesive and/or sealant material. The mixed material may be any adhesive and/or sealant. In one exemplary embodiment, the parts are mixed to form a foam. The foam may be any type of foam and may be selected for any particular application. In one exemplary embodiment, the foam is a two-part latex foam, such as Energy Complete foam available from Owens Corning. In one exemplary embodiment, the foam bead, such as a two-part latex based foam, in addition to sealing the gap, crack, and/or seam 14 acts as a cushion or shock absorber between the building components. The cushioning or shock absorbing effect can significantly reduce the sound emitted through a building wall. For example, a foam bead, such as a two-part latex based foam bead, may be applied between vertical wall studs and interior wall panels that are attached to the studs, such as drywall panels attached to the studs. The foam bead dampens vibration of the interior wall panel to significantly reduce sound that is transmitted through the wall.

The parts 24, 26 may be any compounds utilized in the building arts. In one exemplary embodiment, the two parts 24, 26 do not need to be mixed together. For example, the fluid in a part 24 may be a mastic, a caulking, an adhesive, a sealant or other building product that does not need to be mixed with a second part. A container of the second part may be provided as a backup to a container of the first part or two containers of can be dispensed at the same time to increase the rate at which the material can be dispensed. In other exemplary embodiments, the first and second parts 24, 26 are mixed together before dispensing. For example, when an acrylic latex material is to be provided, a polyacrylic acid, surfactants, and stabilizer may be provided as one part 24 and a plasticizer, a cross linking agent, and a solid base blowing agent is provided in the other container 14. Accordingly, when the fluids are combined, an acrylic foam material would be produced. It will be appreciated that the material produced by the apparatus may be produced by mixing three or more fluids together. In such a case, apparatus may be adapted to include more than two parts.

The supply machine 20 and applicator 22 can take a wide variety of different forms. FIGS. 1, 3, and 5-13 illustrate examples of possible configurations of the supply machine 20 and the applicator 22. In the example illustrated by FIG. 1, the supply machine 20 includes a housing 1012, a first foam part container 1014, a second foam part container 1015, a first foam part pump 1016, and a second foam part pump 1018.

The housing 1012 can take a wide variety of different forms. The housing 1012 may be any structure capable of enclosing and/or supporting the first foam part container 1014, the second foam part container 1015, the first foam part pump 1016, and the second foam part pump 1018.

The first and second foam part containers can take a wide variety of different forms. The containers 1014, 1015 may be any structure capable of holding a liquid. For example, the containers 1014, 1015 may be a bucket, a bag, a bottle, etc. In one exemplary embodiment, the containers 1014, 1015 are bags that include quick connect connectors. The quick connect connectors keep the containers sealed as the containers 1014, 1015 are connected to conduits 1017, 1019 that lead to the pumps 1016, 1018. In an exemplary embodiment, no air enters the bags and the bags collapse as the parts 24, 26 are drawn out of the bags.

The pumps 1016, 1018 may take a wide variety of different forms. In an exemplary embodiment, the pumps 1016, 1018 can be operated to independently regulate the flows of the foam parts 24, 26 from the containers 1014, 1015, through the lines 1021, 1023 to the applicator 22. For example, the pumps 1016, 1018 may be metering pumps, such as peristaltic pumps, gear pumps, and the like. Any pump device capable of being operated to precisely control the flow of the foam parts from the containers 1014, 1015 can be used.

In the example illustrated by FIG. 1, the pump 1016 is optionally coupled to an upstream or vacuum side pressure sensor 1050 and/or a downstream or pressure side pressure sensor 1052. The pressure sensors 1050, 1052 can be coupled to the pump 1016 in a wide variety of different ways. In the illustrated exemplary embodiment, the pressure sensor 1050 is measures the pressure in the line 1017 and the pressure sensor 1052 measures the pressure in the line 1021. In the example illustrated by FIG. 1, the pump 1018 is optionally coupled to an upstream or vacuum side pressure sensor 1060 and/or a downstream or pressure side pressure sensor 1062. The pressure sensors 1060, 1062 can be coupled to the pump 1018 in a wide variety of different ways. In the illustrated exemplary embodiment, the pressure sensor 1060 is measures the pressure in the line 1019 and the pressure sensor 1062 measures the pressure in the line 1023.

The pressure sensors 1050, 1052, 1060, 1062 can be used to monitor a variety of operating conditions of the supply machine 20. For example, the upstream or vacuum sensors 1050, 1060 can be used to determine when the container 1014, 1015, especially a sealed bag or other collapsible container, is empty. The vacuum sensor 1050 is described here, but the vacuum sensor 1060 would sense conditions in the same way. When the container 1014, contains some material 24, operation of the pump 1016, results in a normal, relatively low pressure difference (as compared to atmosphere) being sensed by the pressure sensor 1050. When the container 1014, becomes empty, continued operation of the pump 1016, results in a high vacuum being sensed by the vacuum sensor 1050. In an exemplary embodiment, when the sensor 1050 senses the high vacuum, operation of the pump 1016 is stopped. The sensor 1050 can sense an obstruction in the line 1017 in the same manner.

The downstream or pressure sensors 1052, 1062 can be used to determine when there is a blockage anywhere between the pump 1016, 1018 and the end 1138 of the nozzle 28. The pressure sensor 1052 is described here, but the pressure sensor 1062 would sense blockages in the same way. The pressure sensor 1052 senses when there is a blockage in the line 1021, the valve 1132, or the nozzle 28. The most common blockage is in the nozzle 28. After use, if the nozzle is not purged as discussed below, the materials 24, 26 will cure in the nozzle. When there is no blockage, operation of the pump 1016, results in a normal, relatively low pressure difference (as compared to atmosphere) being sensed by the pressure sensor 1052. When there is a blockage in the line 1021, the valve 1132, or the nozzle 28, continued operation of the pump 1016, results in a high pressure being sensed by the pressure sensor 1052. In an exemplary embodiment, when the sensor 1052 senses the high pressure, operation of the pump 1016 is stopped. A blockage of the nozzle 28 is indicated when both the sensors 1052, 1062 sense a high pressure. A blockage of a line and not the nozzle 28 is indicated when one of the sensors 1052, 1062 senses a high pressure and the other sensor senses a normal pressure.

In the example illustrated by FIG. 1, the pump 1016 is optionally coupled to a purge valve 1070 and the pump 1018 is optionally coupled to a purge valve 1080. The purge valve 1070 is described here, but the purge valve 1080 operates in substantially the same manner. An outlet 1072 of the purge valve 1070 is in communication with the line 1021 when the valve 1070 is open. In an exemplary embodiment, the purge valve 1070 includes a sensor, such as a hall effect sensor, that senses when the purge valve is open. Dashed line 1074 illustrates that the sensor of the purge valve 1070 is in communication with the pump 1016. The sensor of the purge valve 1070 may be in direct communication with the pump 1016, or the signal from the sensor may be provided to a controller that controls the pump. The sensor of the purge valve 1070 causes the pump 1016 to run when the purge valve is open and to stop when the purge valve is closed (assuming the trigger 1134 is not causing the pump 1016 to run).

The purge valve 1070 allows the line 1017 and pump 1016 to be purged in one easy step. When a new container 1014 of material 24 is attached to the pump 1016, an air bubble may be in the container 1014, the line 1017, and/or the pump. The air bubble can be removed simply by opening the purge valve 1070. Opening the purge valve 1070 causes the pump 1016 to pump the material in the pump and the line 1017 and any air bubble entrained therein out the outlet 1072 of the purge valve 1070. Once the air bubbles are removed, the purge valve 1070 is closed and the pump 1016 stops. The supply machine 20 is then operated by the trigger 1134 as described below. In another exemplary embodiment, the machine 20 may be configured to stop the pump 1016 after a predetermined amount of time, to prevent the purge valve 1070 from being inadvertently left open and the material 24 being pumped out of the container 1014.

In the example illustrated by FIG. 1, the applicator 22 includes a housing 1120, a nozzle 28, first and second valves 1132, 1133, and a control or trigger 1134. The housing 1120 can take a wide variety of different forms. The housing 1120 may be any structure capable of enclosing and/or supporting the valves 1132, 1133, the nozzle 28, and/or the trigger 1134.

The nozzle 28 can take a wide variety of different forms. In the exemplary embodiment, the nozzle 28 is mounted to the housing 1120 and receives the first and second parts 24, 26 of the foam from the containers 1014, 1015. The nozzle 28 may include a tortuous inner surface that mixes the first and second parts 24, 26 as the foam material travels toward an outlet 1138 of the nozzle 28.

The valves 1132, 1133 can take a wide variety of different forms. The valves 1132, 1133 can be any arrangement that selectively opens and closes a flow path between the lines 1021, 1023 and the nozzle 28. For example, the valves 1132, 1133 may be needle valves, ball valves, diaphragm valves, shuttle valves or any other type of valve. Further, the valves 1132 may be manually actuated, pneumatically actuated, hydraulically actuated, electrically actuated, and/or magnetically actuated. In one exemplary embodiment, the valve 1132 receives the first part 24 from the container 1014 through line 1021 and the valve 1133 receives the second part 26 from the container 1015 through line 1023.

The control or trigger 1134 can take a wide variety of different forms. In the exemplary embodiment illustrated by FIG. 1, the trigger 1134 controls the first pump 1016, the second pump 1018, the first valve 1132, and the second valve 1133 as represented by control signal lines 1150, 1152, 1154, 1156. In FIG. 1, the control signal lines extend directly from the control or trigger 1134 to the pumps 1016, 1018 and the valves 1132, 1133. While the control or trigger 1134 may be in direct communication with the pumps 1016, 1018 and the valves 1132, 1133 as shown, in other embodiments, the control or trigger 1134 may be coupled to other components that are in turn coupled to the pumps 1016, 1018 and/or the valves 1132, 1133. For example, the control or trigger 1134 may be in communication with one or more controllers that are in turn in communication with the pumps 1016, 1018 and/or the valves 1132, 1133. Further, the trigger 1134 may be mechanically coupled to one or more of the pumps 1016, 1018 and/or the valves 1132, 1133 rather than being in communication through electrical connections and/or wireless signals.

Figure 2:
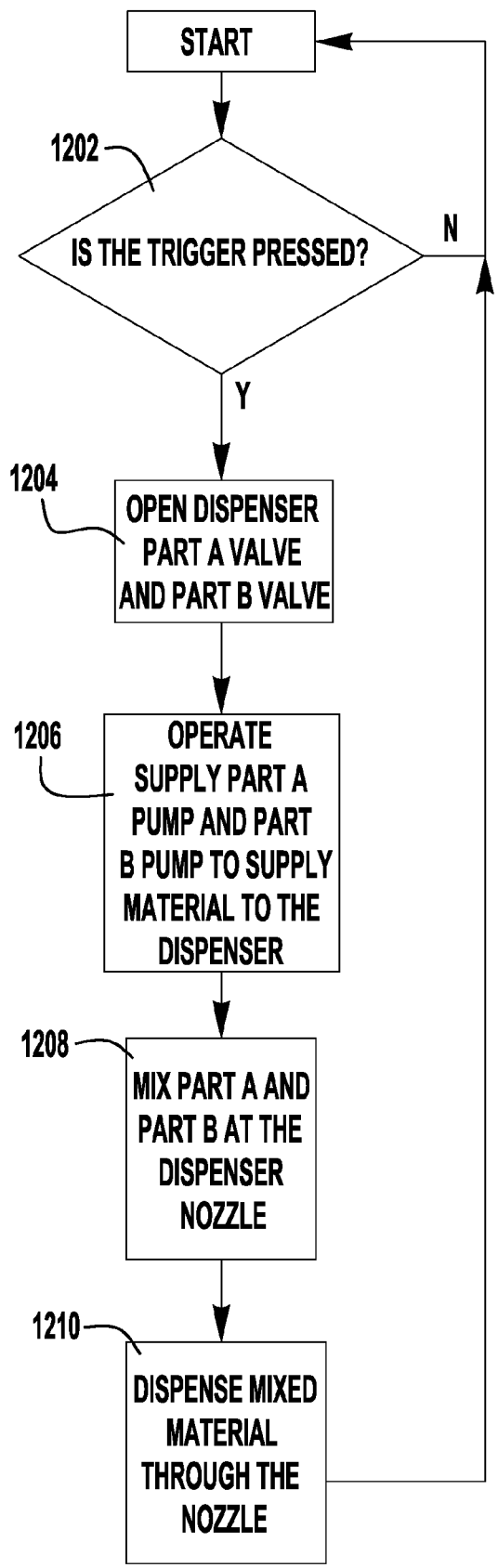
FIG. 2 is a flow chart that illustrates a method of applying a bead of material using the apparatus illustrated by FIG. 1.

Referring to FIGS. 1 and 2, in an exemplary method of dispensing a foam bead 12, activation of the control or trigger 1134 is sensed 1202. The pumps 1016, 1018 are not operated and the valves 1132, 1133 are not opened until the control or trigger 1134 is activated. When the trigger 1134 is pressed or otherwise activated, the valves 1132, 1133 are opened 1204 and the pumps 1016, 1018 are operated 1206. In an exemplary embodiment, pressing of the trigger substantially simultaneously opens the valves 1132, 1133 and operates the pumps 1016, 1018. In another exemplary embodiment, a delay is provided between opening of the valves and operation of the pumps or vice versa. The parts 24, 26 are mixed 1208 at the dispenser nozzle 28 and dispensed 1210 through an outlet 1138 of the nozzle.

Figure 3:
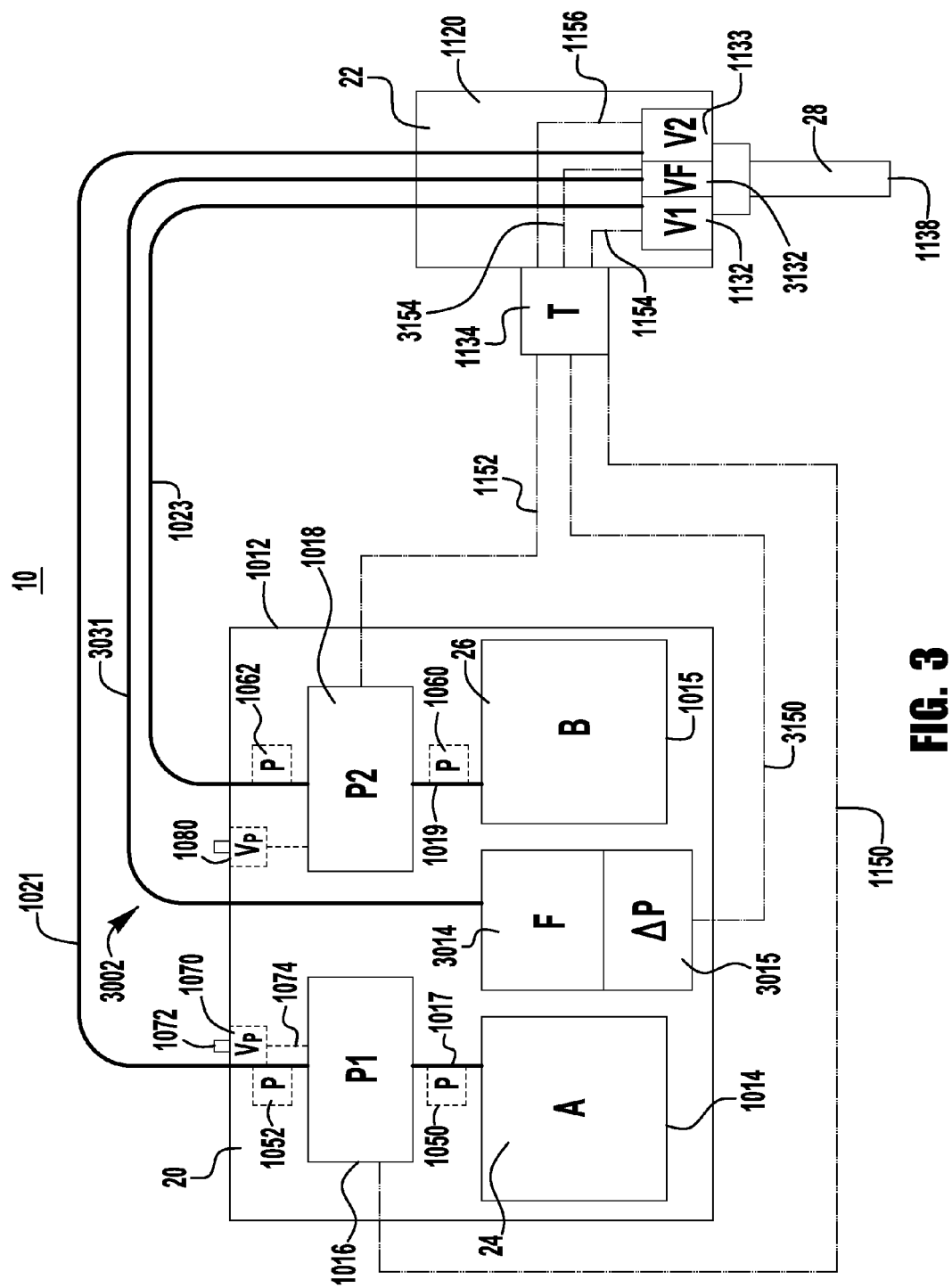
FIG. 3 is a schematic illustration of an exemplary embodiment of an apparatus for mixing and applying a bead of material and for flushing mixed material from the nozzle.

FIG. 3 illustrates another exemplary embodiment of a supply machine 20 and an applicator 22. The embodiment illustrated by FIG. 3 is similar to the embodiment illustrated by FIG. 1, except the supply machine 20 and applicator 22 include an arrangement 3002 for purging the foam parts and/or the foam from the nozzle 28 after use. In the example illustrated by FIG. 3, the machine 20 also includes a supply 3014 of purge fluid and an arrangement 3015 for delivering the purge fluid from the supply machine 20 to the dispenser 22. The dispenser 22 also includes a purge valve 3132 for selectively providing the purge fluid from the supply 3014 of purge fluid to the nozzle 28. A conduit 3031 connects the purge supply 3014 to the purge valve 3132.

The purge fluid can take a wide variety of different forms. The purge fluid can be any fluid capable of cleaning a substantial portion of the foam and/or foam components out of the nozzle 28. For example, the purge fluid can be water, water with additives to prevent freezing, such as automotive windshield washer fluid, a solvent that dissolves the foam, and the like.

The supply 3014 of purge fluid can take a wide variety of different forms. The supply 3014 may be any structure capable of holding a fluid. For example, the supply 3014 may comprise a bucket, a bag, a bottle, etc. The arrangement 3015 for delivering the purge fluid can take a wide variety of different forms. For example, the arrangement 3015 for delivering the purge fluid may be a source of fluid pressure, a pump, and the like. In one exemplary embodiment, the supply 3014 is a rigid container, such as a bottle, and the arrangement 3015 for delivering the purge fluid is a source of fluid pressure that pressurizes the supply. Any apparatus capable of providing the purge fluid to the purge valve 3132 can be used.

The purge valve 3132 can take a wide variety of different forms. The valve 3132 can be any arrangement that selectively opens and closes a flow path between the line 3031 and the nozzle 28. For example, the valve 3132 may be a needle valve, a ball valve, a diaphragm valve, a shuttle valve or any other type of valve. Further, the valves 3132 may be manually actuated, pneumatically actuated, hydraulically actuated, electrically actuated, and/or magnetically actuated. In one exemplary embodiment, the valve 3132 receives the purge fluid from the supply 3014 through line 3031.

The control or trigger 1134 can take a wide variety of different forms. In one exemplary embodiment, the control or trigger 1134 can selectively be placed in an application mode or a supply mode. In the application mode, the trigger 1134 controls the first pump 1016, the second pump 1018, the first valve 1132, and the second valve 1133 as represented by control signal lines 1150, 1152, 1154, 1156 as described above. In an exemplary embodiment, the purge fluid supply/delivery arrangement 3014, 3015 is prevented from operating and the purge valve 3132 is prevented from opening when the control or trigger 1134 is in the application mode.

In the purge mode, the trigger 1134 controls the supply 3014 of purge fluid/arrangement 3015 for delivering the purge fluid and the purge valve 3132 as represented by control signal lines 3150, 3154. In FIG. 3, the control signal lines extend directly from the control or trigger 1134 to the supply/delivery arrangement 3014, 3015 and the valve 3132. While the control or trigger 1134 may be in direct communication with the supply/delivery arrangement 3014, 3015 and/or the valve 3132 as shown, in other embodiments, the control or trigger 1134 may be coupled to other components that are in turn coupled to supply/delivery arrangement 3014, 3015 and/or the valve 3132. For example, the control or trigger 1134 may be in communication with one or more controllers that are in turn in communication with the supply/delivery arrangement 3014, 3015 and/or the valve 3132. Further, the trigger 1134 may be mechanically coupled to one or more of the supply/delivery arrangement 3014, 3015 and the valve 3132 rather than being in communication through electrical connections and/or wireless signals.

Figure 4:
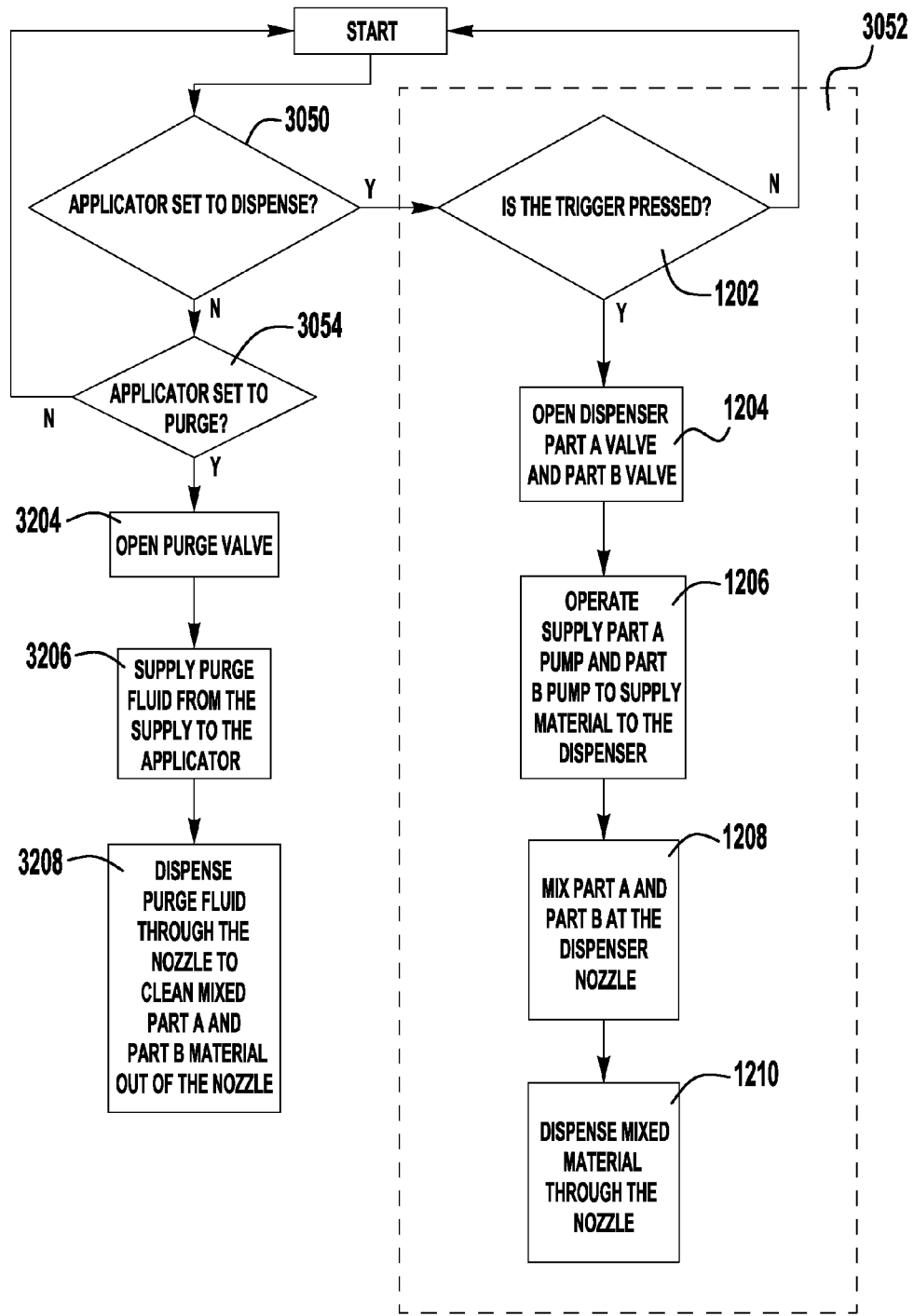
FIG. 4 is a flow chart that illustrates a method of applying a bead of material and flushing mixed material with the apparatus illustrated by FIG. 1.

Referring to FIGS. 3 and 4, in an exemplary method of dispensing a foam bead 12, a controller determines 3050 whether or not the applicator 22 is set to dispense the foam bead 12. If the applicator 22 is set to dispense a foam bead 12, the bead is dispensed by method 3052 as described with respect to FIG. 2. If it is determined that the applicator 22 is not set to dispense a foam bead, the controller determines 3054 whether or not the applicator 22 is set to purge the nozzle 28. If the applicator is set to purge, the purge valve 3132 is opened 3204 and the arrangement 3015 operated 3206 to supply purge fluid from the supply 3014 to the applicator. In an exemplary embodiment, when the applicator is in the purge mode, the first pump 1016 and the second pump 1018 are disabled and the first valve 1132 and the second valve 1133 are prevented from opening.

Optionally, the trigger 1134 controls the opening 3204 of the purge valve and the supplying 3206 of purge fluid. In this embodiment, the purge valve 3132 is not opened until the control or trigger 1134 is activated. When the trigger 1134 is pressed or otherwise activated, the purge valve 3132 is opened 3204 and the arrangement 3015 operated 3206 to supply purge fluid from the supply 3014 to the applicator.

In an exemplary embodiment, when the applicator is set 3054 to purge, the opening of the valve 3132 and operation of the arrangement 3015 for supplying the purge fluid are substantially simultaneous. In another exemplary embodiment, the purge fluid is constantly applied under pressure to the applicator, and setting the applicator to purge only causes opening of the purge valve 3132 to provide the purge fluid to the nozzle. In another embodiment, a delay is provided between opening of the valve 3132 and operation of the arrangement 3015 or vice versa. The purge fluid is dispensed 3208 through the dispenser nozzle 28 to clean the mixed foam parts out of the nozzle.

Figure 5:
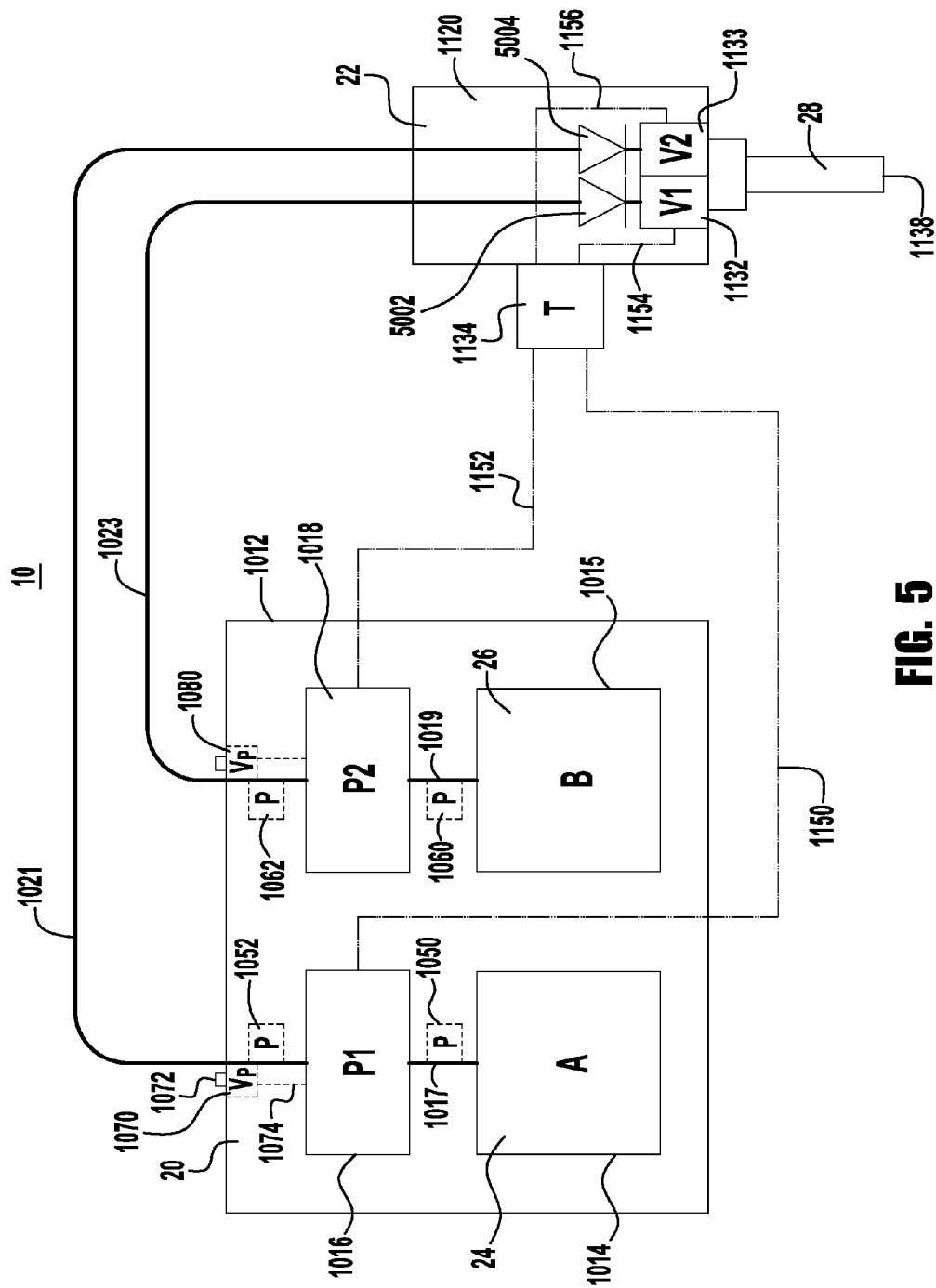
FIG. 5 is a schematic illustration of an exemplary embodiment similar to the embodiment illustrated by FIG. 1 with check valves provided upstream of mixing of the material.

FIG. 5 illustrates another exemplary embodiment of a supply machine 20 and an applicator 22. The embodiment illustrated by FIG. 3 is similar to the embodiment illustrated by FIG. 1, except the applicator 22 includes check valves 5002, 5004. The check valves 5002, 5004 prevent mixed parts 24, 26 from flowing back into the lines 1021, 1023 to thereby prevent the lines 1021, 1023 from becoming clogged or blocked. The check valves 5002, 5004 can be arranged in a variety of different ways. In the example illustrated by FIG. 5, the check valves 5002, 5004 are positioned upstream of the valves 1132, 1133, between valves 1132, 1133 and the lines 1021, 1023. In another exemplary embodiment, the check valves 5002, 5004 are positioned downstream of the valves 1132 1133, between the valves 1132, 1133 and the nozzle 28. In the embodiment where the check valves 5002, 5004 are positioned downstream of the valves 1132 1133, mixed parts 24, 26 are prevented from flowing back into the valves 1132, 1133 to thereby prevent the valves 1132, 1133 from becoming clogged or blocked.

The check valves 5002, 5004 can take a wide variety of different forms. The check valves can be any type of valve that allows fluid to flow in one direction, but prevents the fluid from flowing in the opposite direction. Examples of suitable check valves include, but are not limited to, butterfly or flap valves, valves that comprise a ball member biased against a seat by a spring, reed valves, and the like.

Figure 6:
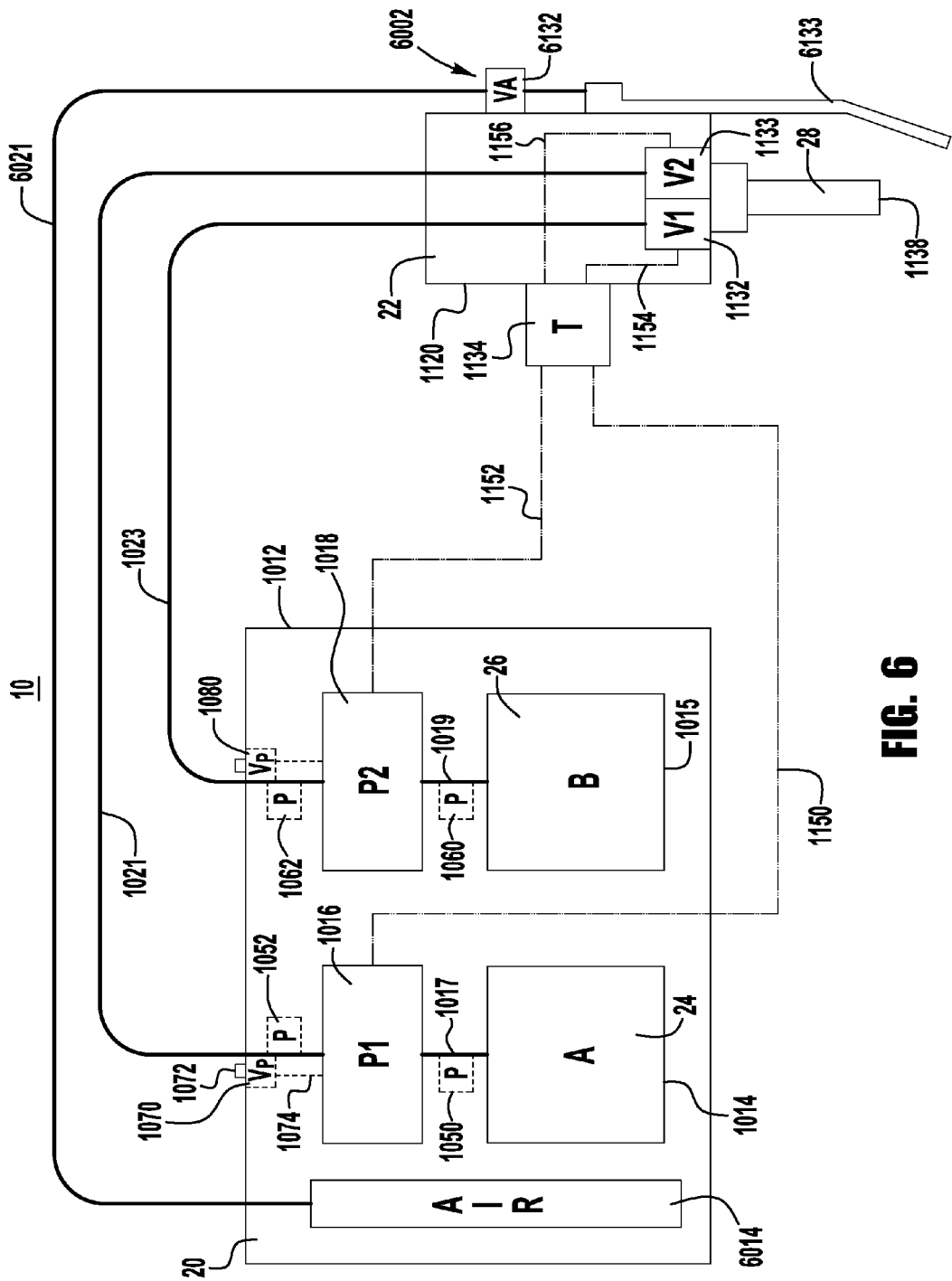
FIG. 6 is a schematic illustration of an exemplary embodiment similar to the embodiment illustrated by FIG. 1 with a cleaning air nozzle.

FIG. 6 illustrates another exemplary embodiment of a supply machine 20 and an applicator 22. The embodiment illustrated by FIG. 6 is similar to the embodiment illustrated by FIG. 1, except the supply machine 20 and applicator 22 include an arrangement 6002 for cleaning an area, such as the crack or seam 14 shown in FIG. 1A, where the foam bead 12 will be applied. In the example illustrated by FIG. 6, the arrangement 6002 includes additional components on the machine 20 and the applicator 22. The machine 20 also includes a supply 6014 of cleaning fluid, such as pressurized air and the dispenser 22 also includes a cleaning fluid valve 6132 and cleaning fluid nozzle 6133. The cleaning fluid valve 6132 may be selectively opened or closed to provide fluid under pressure, such as an air jet, through the cleaning fluid nozzle 6133. The air jet may be used to clean the area, such as the crack or seam 14, as the bead is being applied. That is, the fluid under pressure, such as an air jet, may be provided through the nozzle 6132 at the same time the bead 12 is applied through the nozzle 28. In an exemplary embodiment, the arrangement 6002 for cleaning the crack or seam 14 may be operated (i.e. turned on and off) independent of dispensing of the bead and/or placing the applicator 22 in a bead dispensing mode. That is, the arrangement 6002 may provide a cleaning air jet when a bead 12 is not being dispensed. The cleaning fluid can take a wide variety of different faints. In most applications, the cleaning fluid is air. In other embodiments, the cleaning fluid may be another gas, such as an inert gas.

The supply 6014 of cleaning fluid can take a wide variety of different forms. The supply 6014 may be any structure capable of holding a fluid. For example, the supply 6014 may comprise a bucket, a bag, a bottle, or cylinder etc. In one exemplary embodiment, the supply 6014 is a pressurized air cylinder. The pressurized air cylinder 6014 may be automatically replenished by an external source, such as an air compressor. Any apparatus capable of providing the cleaning fluid to the cleaning fluid valve 6132 can be used.

The cleaning valve 6132 can take a wide variety of different forms. In one exemplary embodiment, the valve 6132 receives the cleaning fluid from the supply 6014 through line 6021. The valve 6132 can be any arrangement that selectively opens and closes a flow path between the line 6021 and the nozzle 6132. For example, the valve 6132 may be a needle valve, a ball valve, a diaphragm valve, a shuttle valve or any other type of valve. Further, the valves 3132 may be manually actuated, pneumatically actuated, hydraulically actuated, electrically actuated, and/or magnetically actuated.

Figure 7:
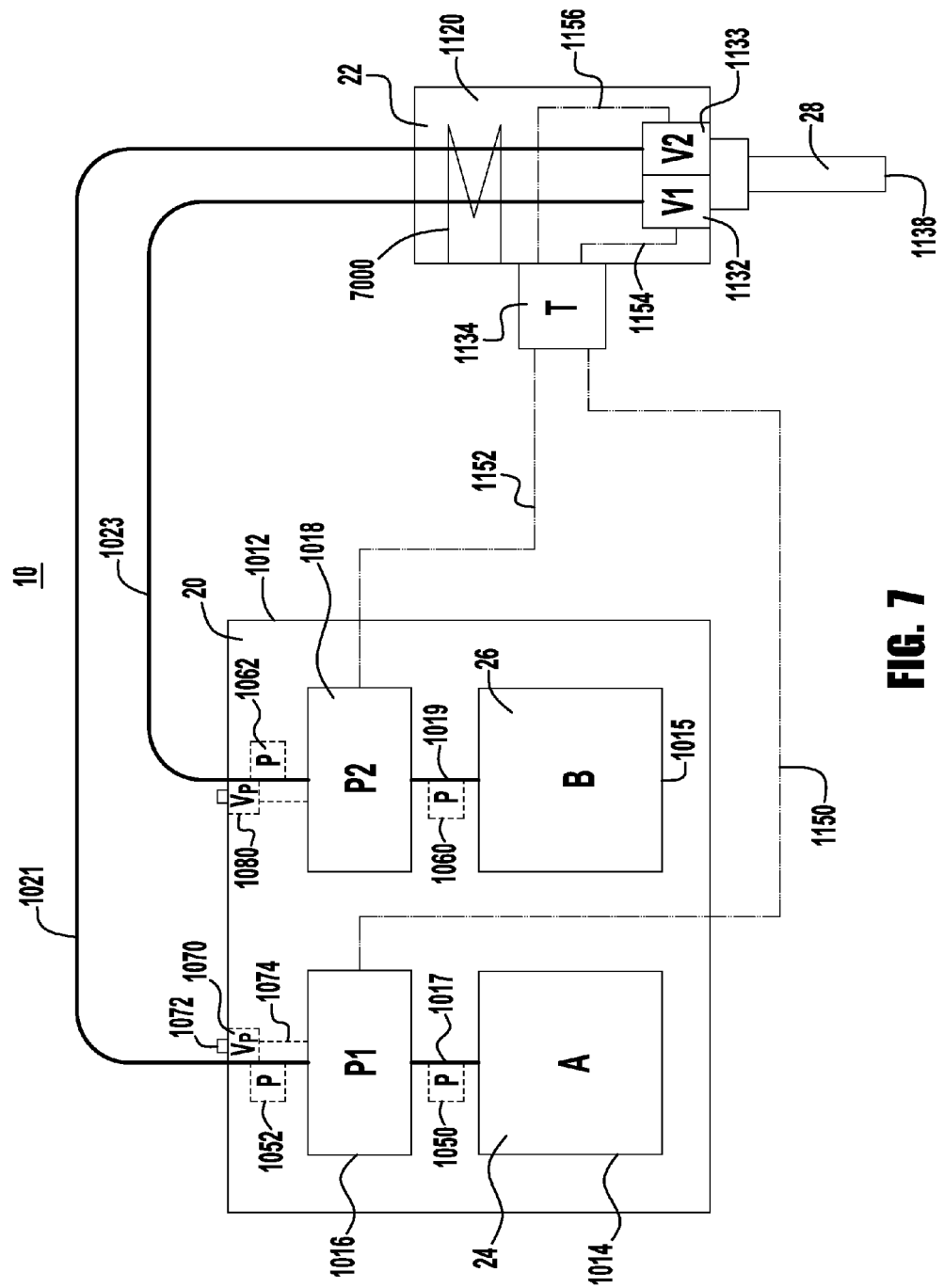
FIG. 7 is a schematic illustration of an exemplary embodiment similar to the embodiment illustrated by FIG. 1 with a heater provided in the dispenser.

FIG. 7 illustrates another exemplary embodiment of a supply machine 20 and an applicator 22. The embodiment illustrated by FIG. 7 is similar to the embodiment illustrated by FIG. 1, except the applicator 22 includes a heater 7000 in the housing 1120. The heater 7000 heats the parts 24, 26 in the housing 1120. The heating of the parts 24, 26 in the housing reduces the viscosity of the parts and/or prevents the parts 24, 26 from freezing when the applicator is used in a cold environment. In one exemplary embodiment, the heater 7000 allows the applicator 22 to be used in cold environments, such as when the ambient temperature is below freezing, 20 degrees F., or below 20 degrees F.

The heater 7000 may take a wide variety of different forms. The heater may comprise any arrangement capable of applying heat to the parts 24, 26 in the housing 1120 of the applicator 22. For example, the heater may be an electrical, coil or other resistance type heater. The heater 7000 may be turned on manually and/or the applicator may also include an thermostat that automatically turns the heater on and off to regulate the temperature of the parts 24, 26 in the housing 1120 of the applicator 22.

Figure 8:
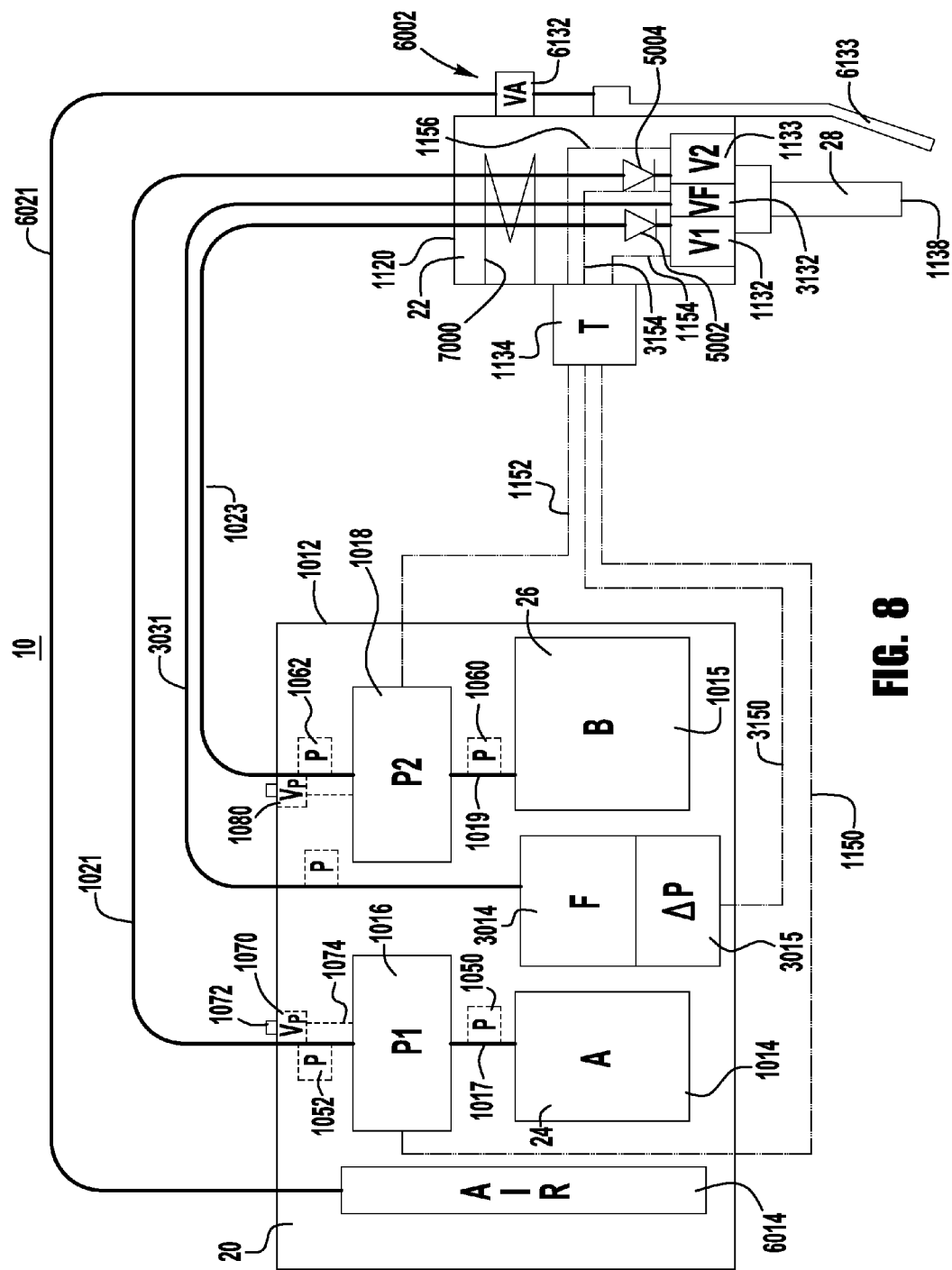
FIG. 8 is a schematic illustration of an exemplary embodiment similar to the embodiment illustrated by FIG. 1 with check valves provided upstream of mixing of the material, a cleaning air nozzle, and a heater provided in the dispenser.

FIG. 8 is an exemplary embodiment of another exemplary embodiment of a supply machine 20 and an applicator 22. The embodiment illustrated by FIG. 8 includes all of the features of the embodiments illustrated by FIGS. 1, 3, 5, 6, and 7. In other embodiments, some of the features from the embodiments illustrated by FIGS. 1, 3, 5, 6, and 7 may be omitted from the embodiment illustrated by FIG. 8.

Figure 9:
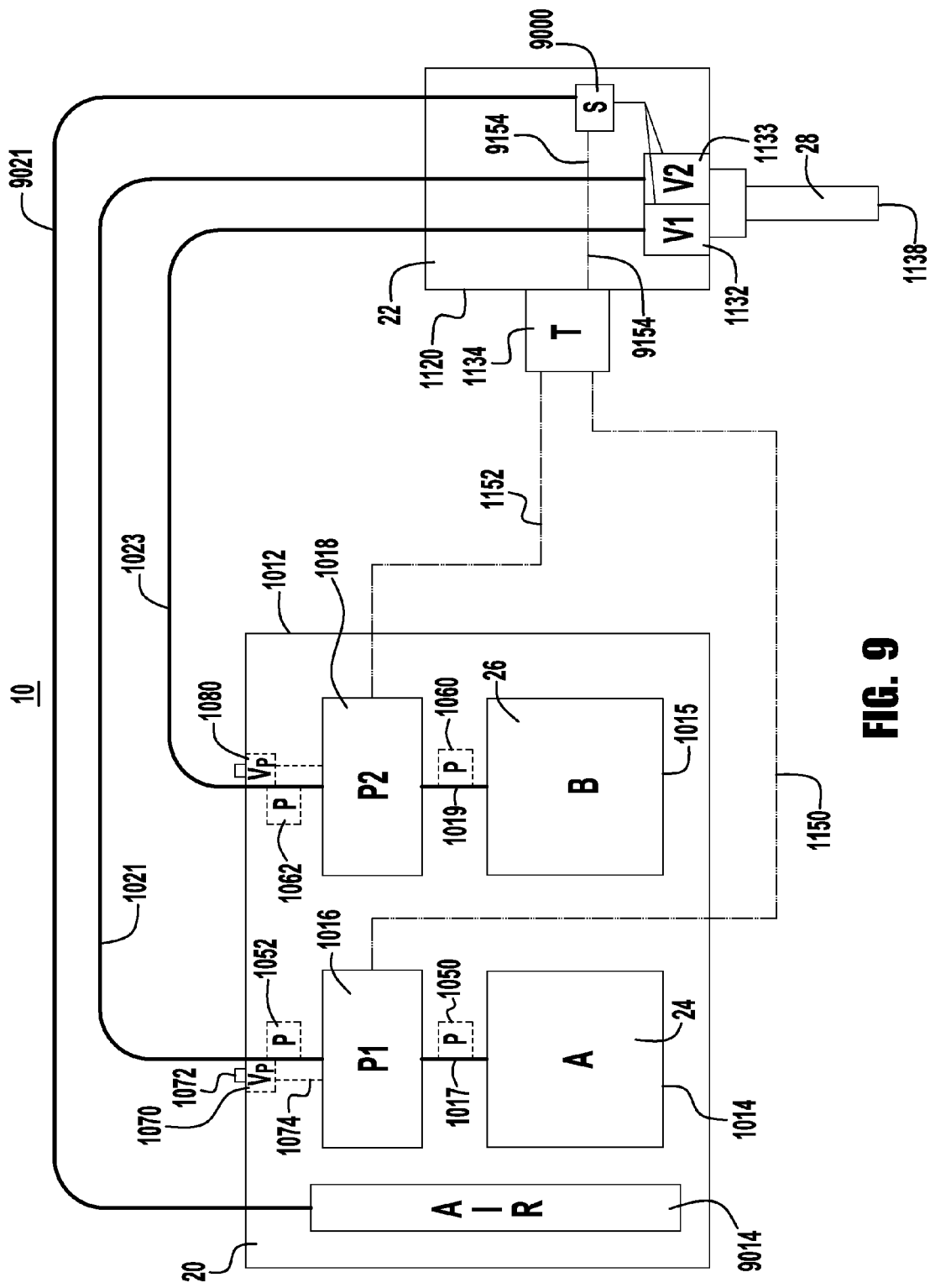
FIG. 9 is a schematic illustration of an exemplary embodiment similar to the embodiment illustrated by FIG. 1 with dispensing valves being operated by an air powered actuator.

As is noted above, the valves 1132, 1133 can take a wide variety of different forms. FIG. 9 illustrates an exemplary embodiment where the valves are opened and closed by an actuator 9000, such as an electric solenoid or an electrically controlled pneumatic actuator. In the illustrated embodiment, an electrically controlled pneumatic actuator is connected to an air supply 9014 by a line 9021. In the example illustrated by FIG. 9, the control or trigger 1134 controls the first pump 1016, the second pump 1018, and the actuator 9000, which in turn opens and closes the first valve 1132, and the second valve 1133 as represented by control signal lines 1150, 1152, and 9154. In FIG. 9, the control signal line 9154 extends directly from the control or trigger 1134 actuator 9000. While the control or trigger 1134 may be in direct communication with the actuator 9000 as shown, in other embodiments, the control or trigger 1134 may be coupled to other components that are in turn coupled to the actuator 9000. For example, the control or trigger 1134 may be in communication with a controller that is in communication with the actuator 9000.

Figure 9A:
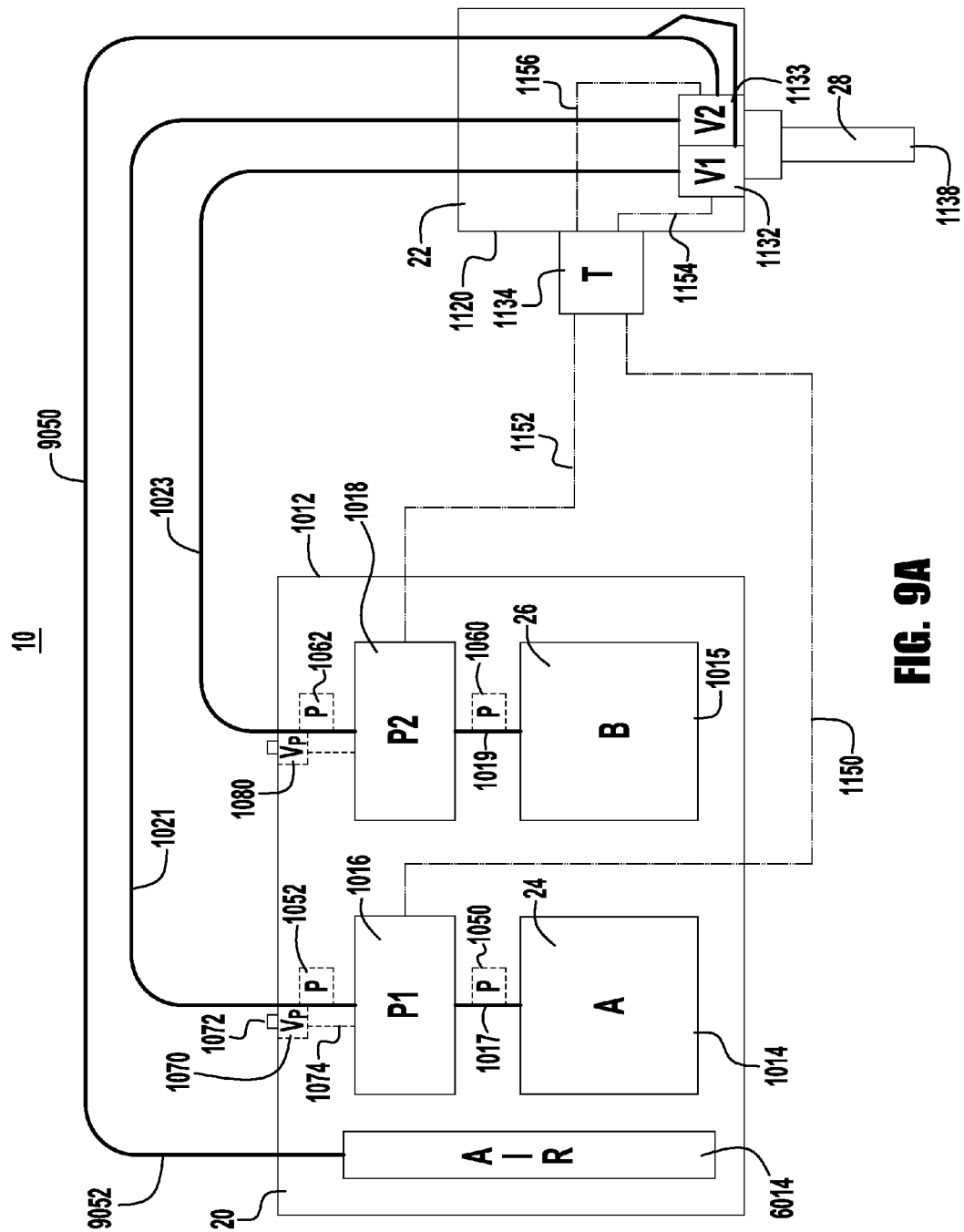
FIG. 9A is a schematic illustration of an exemplary embodiment similar to the embodiment illustrated by FIG. 1 with dispensing valves being operated by pressurized air.

FIG. 9A illustrates an exemplary embodiment where the valves are directly opened and closed by a pneumatic force, such as air pressure provided through a line 9050 from a source 9052 or air under pressure. That is, the valves 1132, 1133 are pneumatically actuated valves. In the exemplary embodiment illustrated by FIG. 9A, the trigger 1134 controls the first pump 1016, the second pump 1018, the first valve 1132, and the second valve 1133 as represented by control signal lines 1150, 1152, 1154, 1156 in the same manner as described with respect to FIG. 1, with the force needed to open and close the valve being provided by air under pressure.

Figure 10:
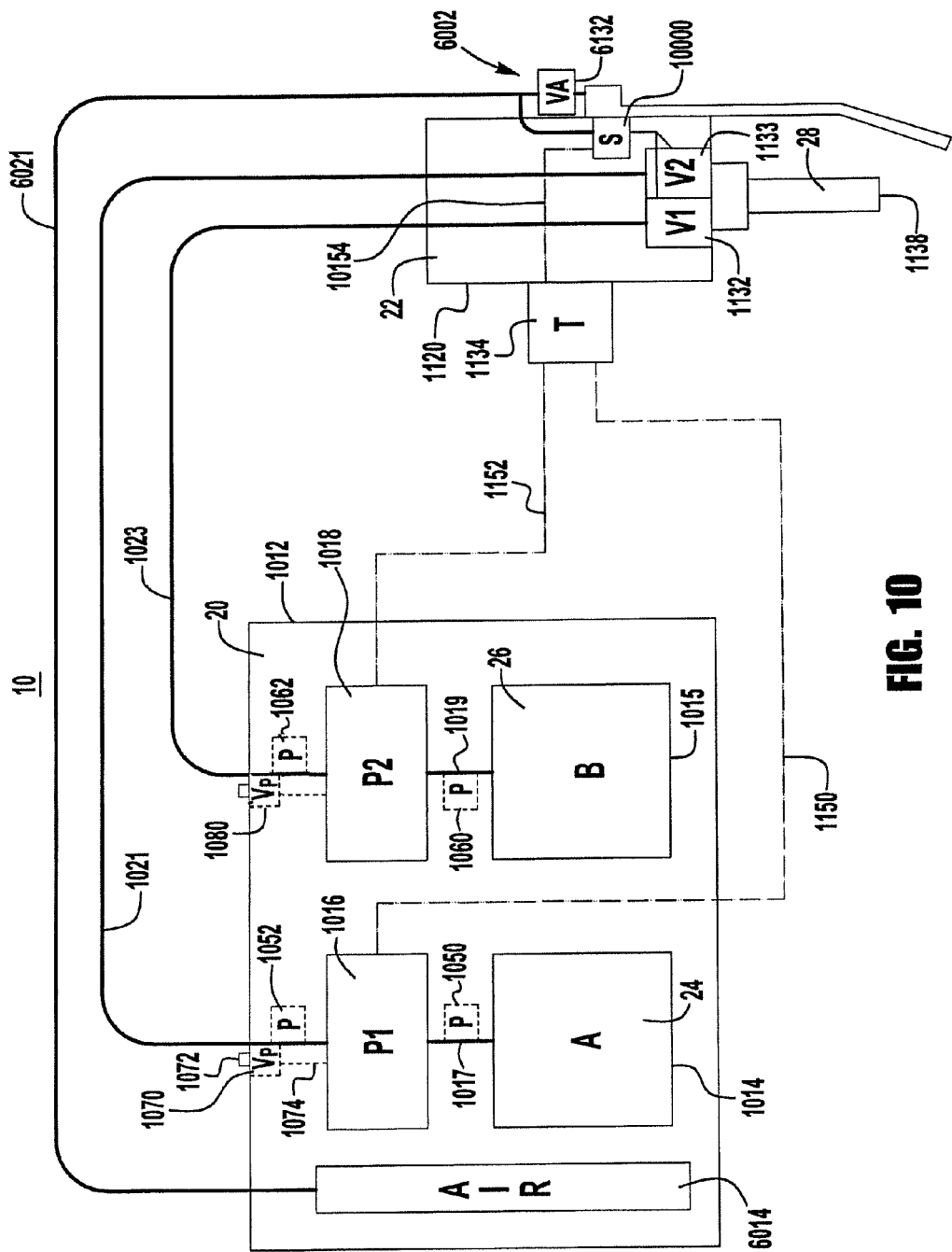
FIG. 10 is a schematic illustration of an exemplary embodiment similar to the embodiment illustrated by FIG. 9 with an air cleaning nozzle.

FIG. 10 illustrates an exemplary embodiment that is similar to the embodiment illustrated by FIG. 6, except the valves 1132, 1133 are opened and closed by a pneumatic actuator 10000. In the example illustrated by FIG. 10, the control or trigger 1134 controls the first pump 1016, the second pump 1018, and the pneumatic actuator 10000, which in turn opens and closes the first valve 1132, and the second valve 1133 as represented by control signal lines 1150, 1152, and 10154. In FIG. 10, the control signal line 10154 extends directly from the control or trigger 1134 to the actuator 10000. While the control or trigger 1134 may be in direct communication with the actuator 10000 as shown, in other embodiments, the control or trigger 1134 may be coupled to other components that are in turn coupled to the actuator 10000. For example, the control or trigger 1134 may be in communication with a valve, a controller, or other device, that is in communication with the actuator 10000.

Figure 11:
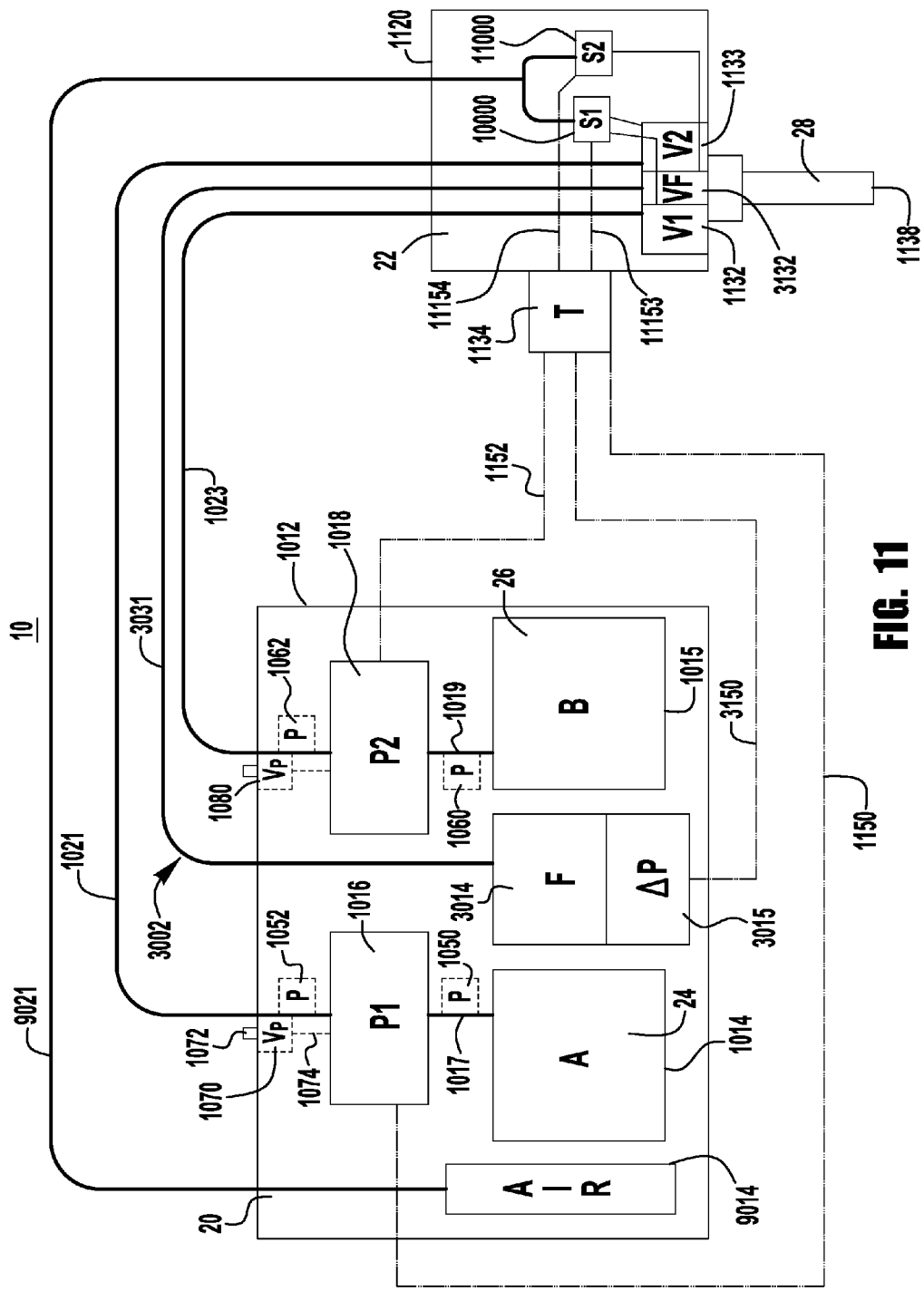
FIG. 11 is a schematic illustration of an exemplary embodiment similar to the embodiment illustrated by FIG. 3 with dispensing valves and a flush valve being operated by air powered actuators.

FIG. 11 illustrates an exemplary embodiment that is similar to the embodiment illustrated by FIG. 3, except the valves 1132, 1133 are opened and closed by a pneumatic actuator 10000, and the valve 3132 is opened and closed by a pneumatic actuator 11000. As in the embodiment illustrated by FIG. 3, the control or trigger 1134 can selectively be placed in an application mode or a supply mode. In the application mode, the trigger 1134 controls the first pump 1016, the second pump 1018, and the pneumatic actuator 10000, which in turn controls the first valve 1132, and the second valve 1133 as represented by control signal lines 1150, 1152, 11153. In the purge mode, the trigger 1134 controls the supply 3014 of purge fluid/arrangement 3015 for delivering the purge fluid and the pneumatic actuator 11000, which in turn controls the purge valve 3132 as represented by control signal lines 3150, 11154. In FIG. 3, the control signal line 11154 extends directly from the control or trigger 1134 to the pneumatic actuator 11000. While the control or trigger 1134 may be in direct communication with the pneumatic actuator 11000 as shown, in other embodiments, the control or trigger 1134 may be coupled to other components that are in turn coupled to the pneumatic actuator 11132. For example, the control or trigger 1134 may be in communication with one or more, valves, controllers, or other devices, that are in turn in communication with the pneumatic actuator 11000.

Figure 12:
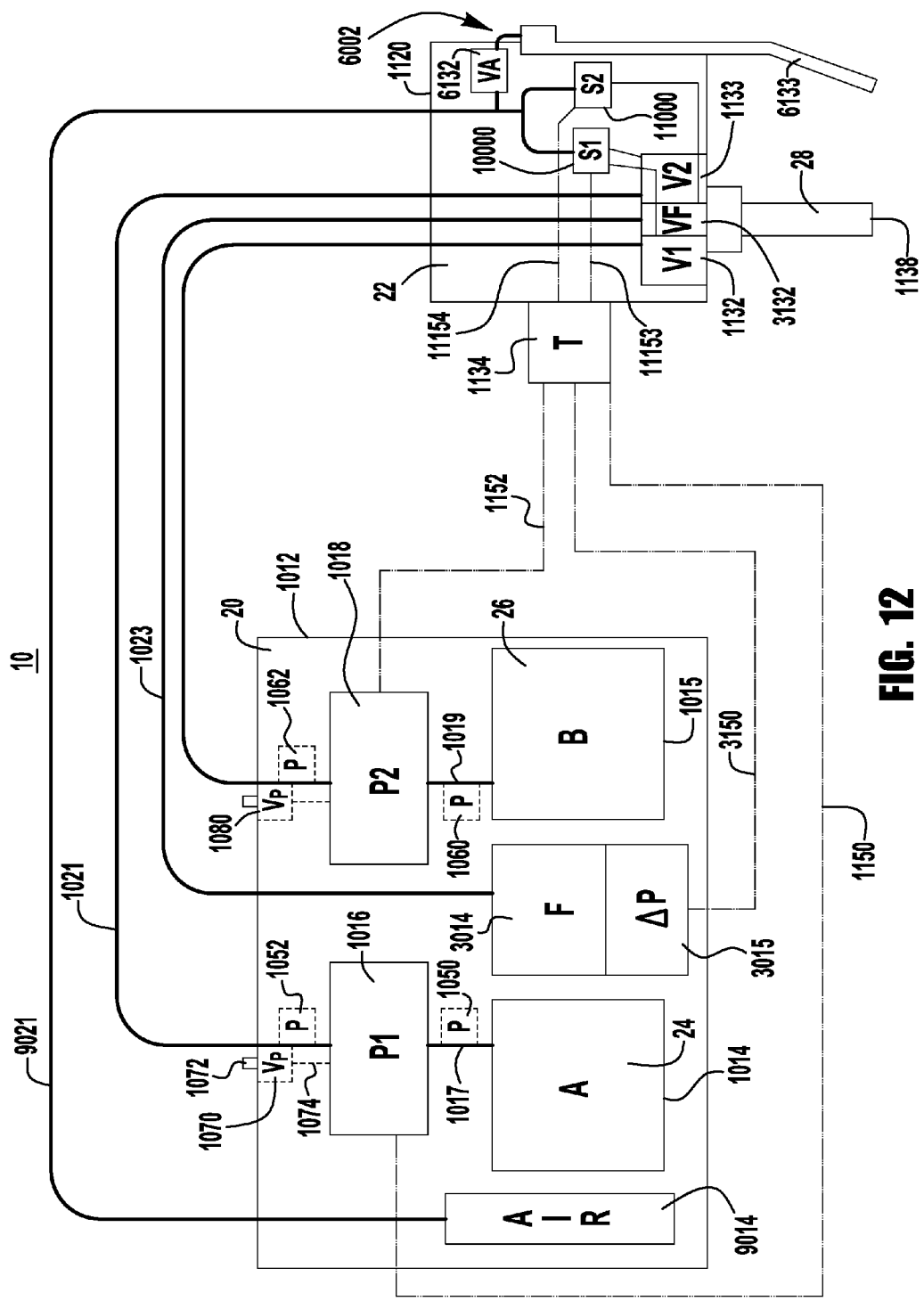
FIG. 12 is a schematic illustration of an exemplary embodiment similar to the embodiment illustrated by FIG. 12 with an air cleaning nozzle.

FIG. 12 illustrates an exemplary embodiment that is similar to the embodiment illustrated by FIG. 11, except the applicator 22 includes the arrangement 6002 for cleaning the crack or seam 14 of FIG. 6. In the example illustrated by FIG. 12, a single supply 9014 provides the pneumatic actuators 10132, 11132 and the cleaning fluid nozzle 6133 with pressurized air.

Figure 13:
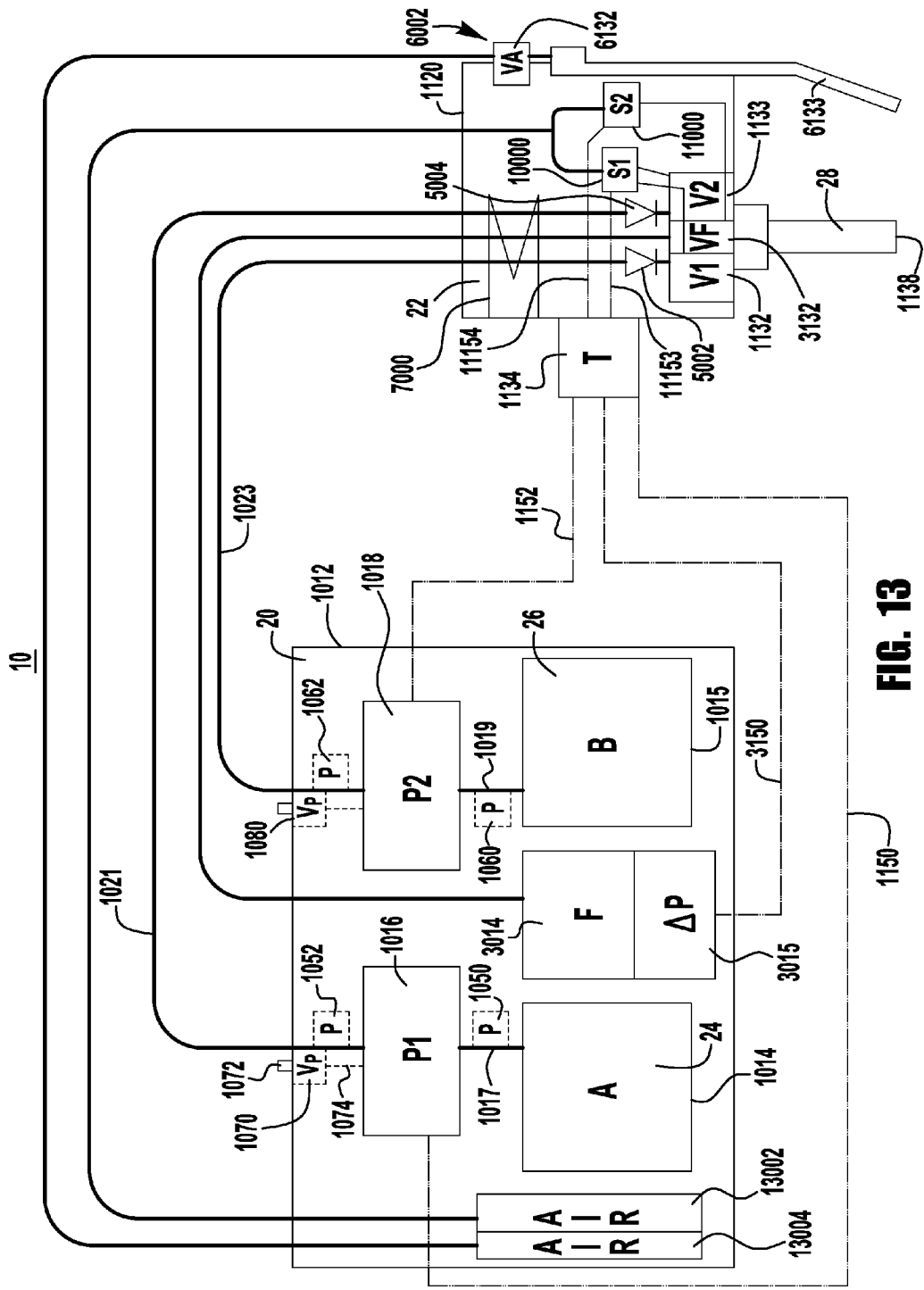
FIG. 13 is a schematic illustration of an exemplary embodiment similar to the embodiment illustrated by FIG. 13 with check valves positioned upstream of mixing of the material and a heater provided in the dispenser.

FIG. 13 illustrates an exemplary embodiment of a supply machine 20 and an applicator 22 where two separate or isolated sources of air pressure 13002, 13004 supply the pneumatic actuators 10000, 11000 and the cleaning fluid nozzle 6133. Two separate or isolated supplies prevent the discharge of pressurized air from the cleaning fluid nozzle 6133 from inhibiting operation of the pneumatic actuators 10000, 11000. In the example illustrated by FIG. 13, the applicator 22 also includes the check valves 5002, 5004 of the FIG. 5 embodiment and the heater 7000 of the FIG. 7 embodiment.

FIGS. 14A-14C and FIGS. 15A-15C illustrate an exemplary embodiment of a supply machine 20 that senses a position of a container 14000 that houses the two foam part containers 1014, 1015. In the illustrated example, the housing 1012 of the supply machine 20 includes a foam container sensor 14106 and the two-part foam container 14000 includes a sensed device 14208. The foam container sensor 14106 senses the sensed device 14208 to determine whether or not the two-part foam container 14000 is correctly installed in the supply machine.

In the exemplary embodiment illustrated by FIGS. 14A-14C, the two-part foam container 14000 is a box that the first foam part container 1014 and the second foam part container 1015 are disposed in. In an exemplary embodiment, the first and second foam part containers 1014, 1015 are sealed and are not opened to the atmosphere during the process of connecting the containers with the pumps 1016, 1018 (See FIG. 1), such that no dirt or other contaminants can enter the containers 1014, 1015. The two-part foam container 14000 includes the sensed device 14208.

In an exemplary embodiment, the sensed device 14208 is connected to the container 14000, such that if the two-part foam container 14000 is installed correctly in the housing 1012 of the supply machine 20, the sensed device 14208 is sensed by the sensor 14106. For example, FIGS. 14A-14C illustrate the two-part foam container 14000 installed correctly in the housing 1012. In the example illustrated by FIGS. 14A-14C, the sensed device 14208 is aligned with and/or positioned close enough to be sensed by the sensor 14106. Referring to FIGS. 15A-15C, if the container 14000 is not positioned or installed correctly in the housing 1012, the sensed device 14208 is not sensed by the sensor 14106. In the example of FIGS. 15A-15C, the sensed device 14208 is not aligned with and/or is positioned to far away to be sensed by the sensor 14106.

In an exemplary embodiment, when the sensed device 14208 is not sensed by the sensor 14106, the machine 20 is prevented from operating, thereby preventing damage to the machine due to incorrect installation of the two-part foam container 14000. For example, the sensed device 14208 and sensor 14106 can prevent the machine 20 from operating if the first foam part container 1014 is connected to the second foam part pump 1018 and the second foam part container 1015 is connected to the first foam part pump 1016.

The foam container sensor 14106 and the sensed device 14208 can take a wide variety of different forms. For example, the sensor 14106 and the sensed device 14208 may be an a transceiver that reads RFID tags and a RFID tag, a bar code reader and a printed bar code, and the like. Any arrangement capable of providing a signal when the container 14000 is positioned and/or installed correctly in the housing 1012 can be used.

The foam container sensor 14106 may be included in the housing 1012 in a wide variety of different ways. In an exemplary embodiment, the foam container sensor 14106 is attached inside the housing 1012. For example, the foam container sensor may be attached to a base 14102 or a lid 14104 of the housing 1012. In the illustrated embodiment, the foam container sensor 14106 is attached to the lid 14104 of the housing 1012. The sensor 14106 may be included in a controller that is housed by the lid 14104.

The sensed device 14208 may be included in the container 1014 in a wide variety of different ways. The sensed device 14208 can be attached to the first foam part container 1014, a coupler of the first foam part container 14202, the second foam part container 1015, a coupler of the second foam part container, and/or the box 14000. In an exemplary embodiment, the sensed device 14208 is attached to an outside surface of the box.

The sensed device 14208 may store a wide variety of different information. For example, the sensed device 14208 may contain operation parameters for the particular foam parts that are supplied in the box 14000. In an exemplary embodiment, the ratio of the amount of the first foam part to the amount of the second foam part to be delivered by the machine 20 is provided by the sensed device 14208 to a controller. This ratio is used to set the ratio of the speed of the first pump to the speed of the second pump. This ensures that the proper ratio of the foam parts is dispensed by the machine 20 each time the two-part foam container 1014 might be changed. Different two part foam containers 1014 may have different operating parameters, such as different mix ratios. Other operating parameters for the boxed foam parts may also be provided by the sensed device 14208 and stored by the controller. For example, the batch number of the box 14000, temperature compensation information and other operating information, production date, expiration date, etc may be provided by the sensed device 14208.

Figure 16:
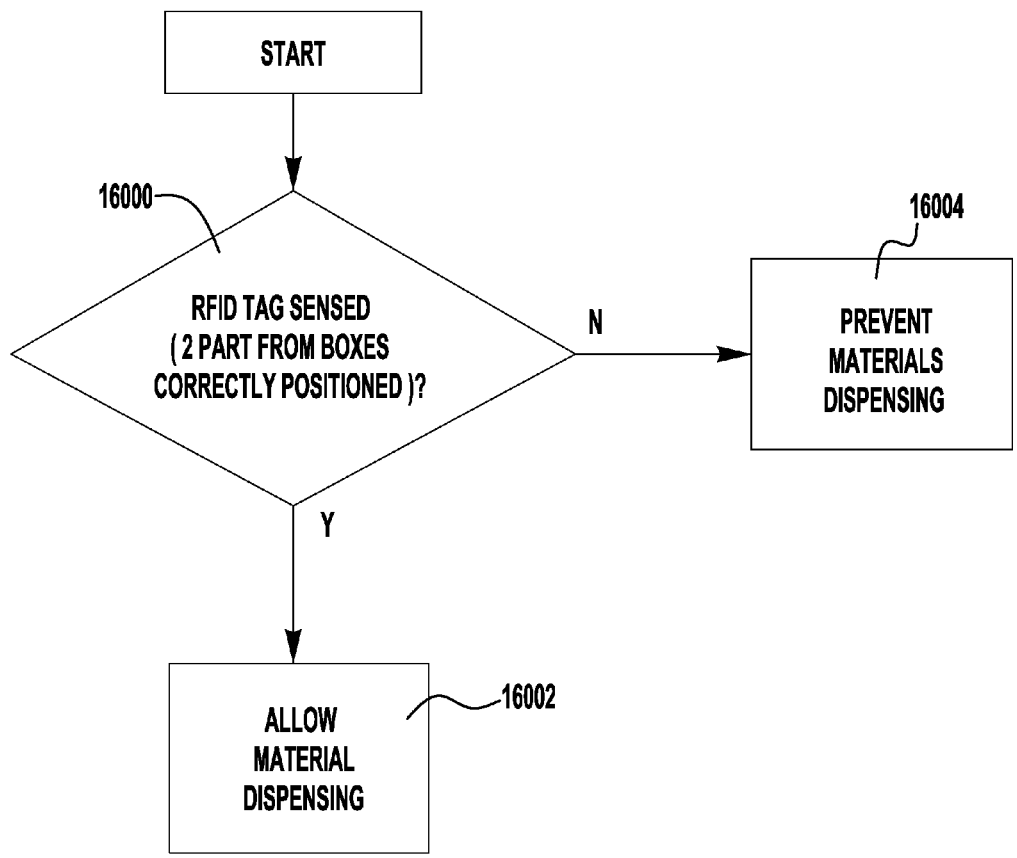
FIG. 16 is a flow chart that illustrates an exemplary embodiment of a method of operation of the material supply machine illustrated by FIGS. 14 and 15.

FIG. 16 is a flowchart that illustrates a method of verifying that a two-part foam container 14000 is properly installed in a foam supply machine 20 that includes the features of the embodiment of FIGS. 14A-14C. The two-part foam container 14000 is installed in the supply machine 20. At step 16000, the sensor 14106 attempts to sense the sensed device 14208. If the sensed device 14208 is sensed, dispensing of the foam parts 24, 26 is allowed 16002. If the sensed device 14208 is not sensed, dispensing of the foam parts 24, 26 is not allowed 16004.

Figure 17:
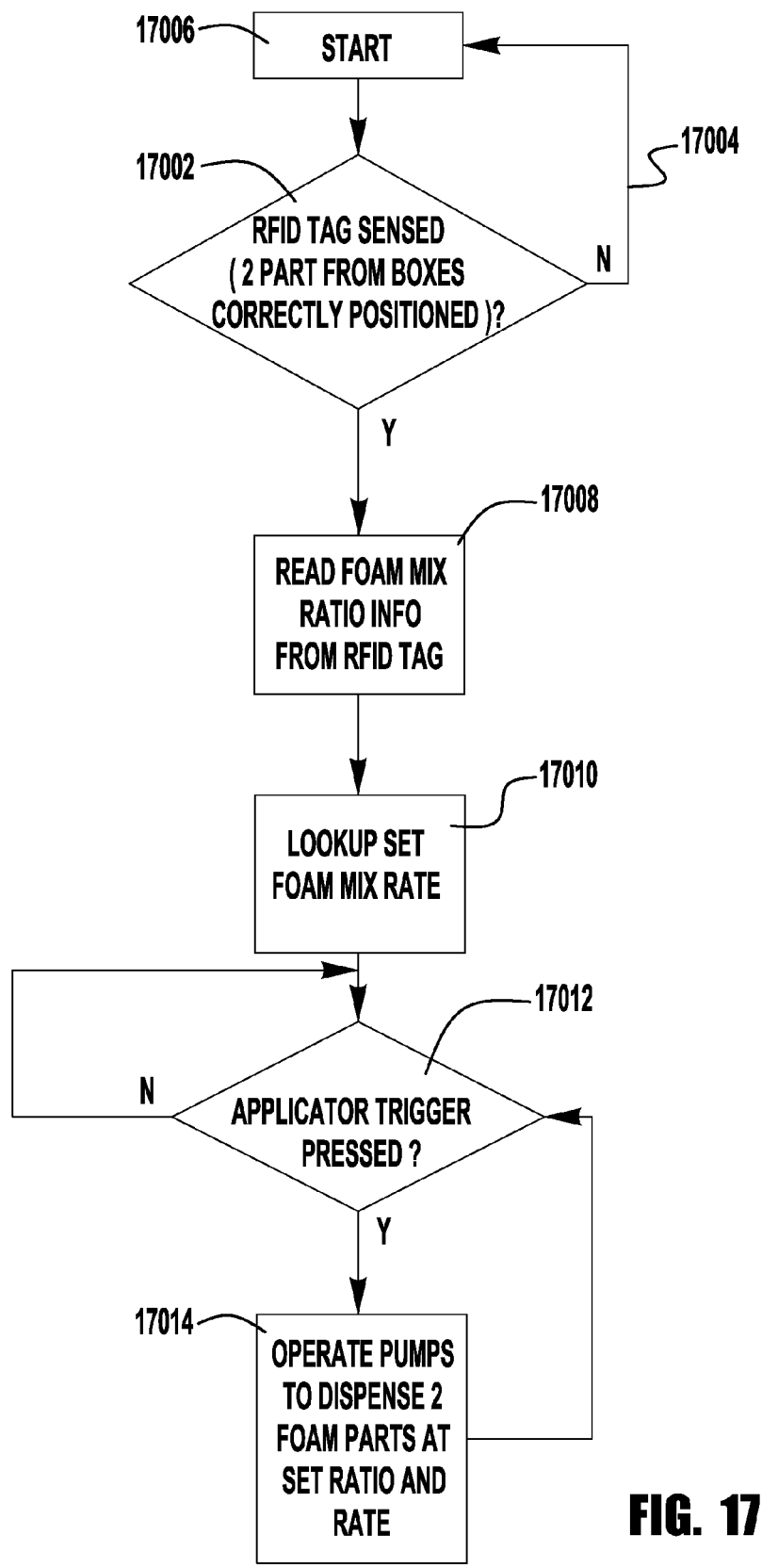
FIG. 17 is a flow chart that illustrates another exemplary embodiment of operation of the material supply machine illustrated by FIGS. 14 and 15.

FIG. 17 is a flowchart that illustrates an exemplary method of dispensing a two part foam. A supply machine 20 and applicator 22 used to perform the method illustrated by FIG. 17 would have the features of the embodiments illustrated by FIG. 1 and FIGS. 14A-14C. The two-part foam container 14000 is installed in the supply machine 20. At step 17002, the sensor 14106 attempts to sense the sensed device 14208. If the sensed device 14208 is not sensed, dispensing of the foam parts 24, 26 is not allowed 17004 and the method restarts 17006. If the container 1014 is properly installed, the sensor 14106 reads the foam part mix ratio from the sensed device 14208 at step 17008. The rate or speed at which the foam is to be dispensed may optionally be set by the user. At step 17010, the set dispense rate is looked up. At step 17012, the controller determines whether the operator is pressing the trigger of the applicator 22. If the operator is pressing the trigger of the applicator 22, the controller operates the pumps 1016, 1018 to dispense the two foam parts to the applicator 22 at the set ratio and rate at step 17014.

FIGS. 18-28 illustrate another exemplary embodiment of an applicator 22. FIGS. 29-34 illustrate another exemplary embodiment of a two-part foam supply machine 20. In one exemplary embodiment, the applicator 22 illustrated by FIGS. 18-28 is used to mix and apply the two foam parts 24, 26 provided by the supply machine 20. The applicator 22 controls the supply of the first part 24 of the foam, a supply of the second part 26 of the foam, a purge fluid 18016, pressurized cleaning air 18018, and pressurized control air 18020 that is received through hoses 18022. In an application mode, the applicator 22 mixes the first part 24 and the second part 26 of the foam at/in a nozzle 18024. In an exemplary embodiment the first and second parts 24, 26 are not mixed prior to reaching the nozzle 18024. The applicator 22 dispenses the mixed foam through the nozzle at a low pressure. The nozzle 18024 provides a bead 12 of the foam material, rather than spraying the foam like a paint gun. In an exemplary embodiment, the applicator 22 includes electronic controls that allow the two-part foam to be applied at different speeds. A head 18025 of the applicator 22 may be provided with a heater, in addition to a heater that heats the foam parts 24, 26 in the hoses 22 to prevent the components of the two-part foam from freezing.

The applicator 22 can be operated to provide cleaning air 18018 through a second nozzle 18026. The cleaning air 18018 blows away any dirt or debris in the area where the bead 12 of the foam material is to be applied.

In a purge mode, the applicator 22 flushes the nozzle 18024 with the purge fluid 18016. Purging the nozzle with the purge fluid 18016 cleans out the nozzle 18024 to allow the nozzle to be reused at a later time.

Figure 18:
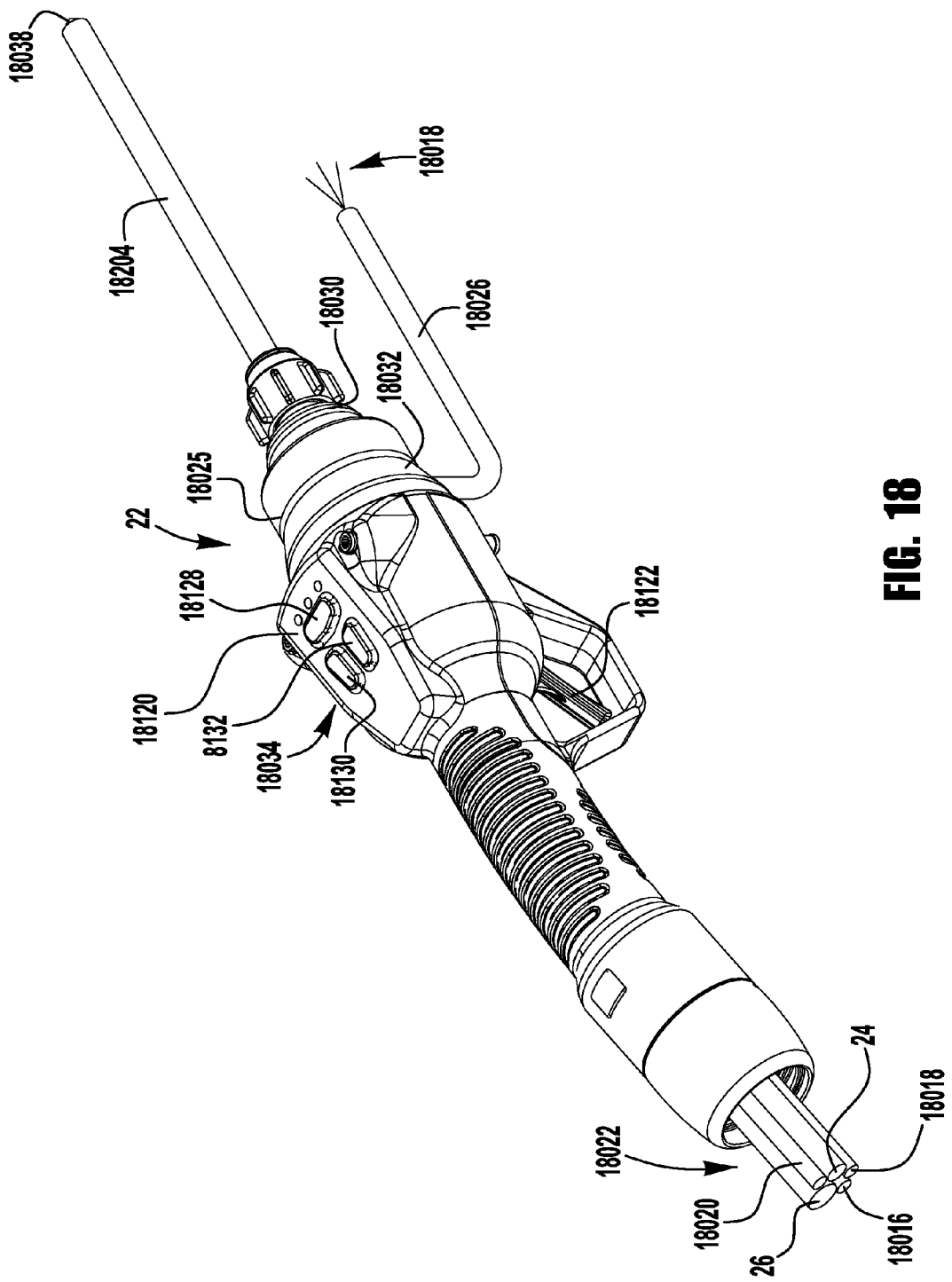
FIG. 18 is a perspective view of an exemplary embodiment of an applicator for mixing and applying a bead of material.
Figure 19:
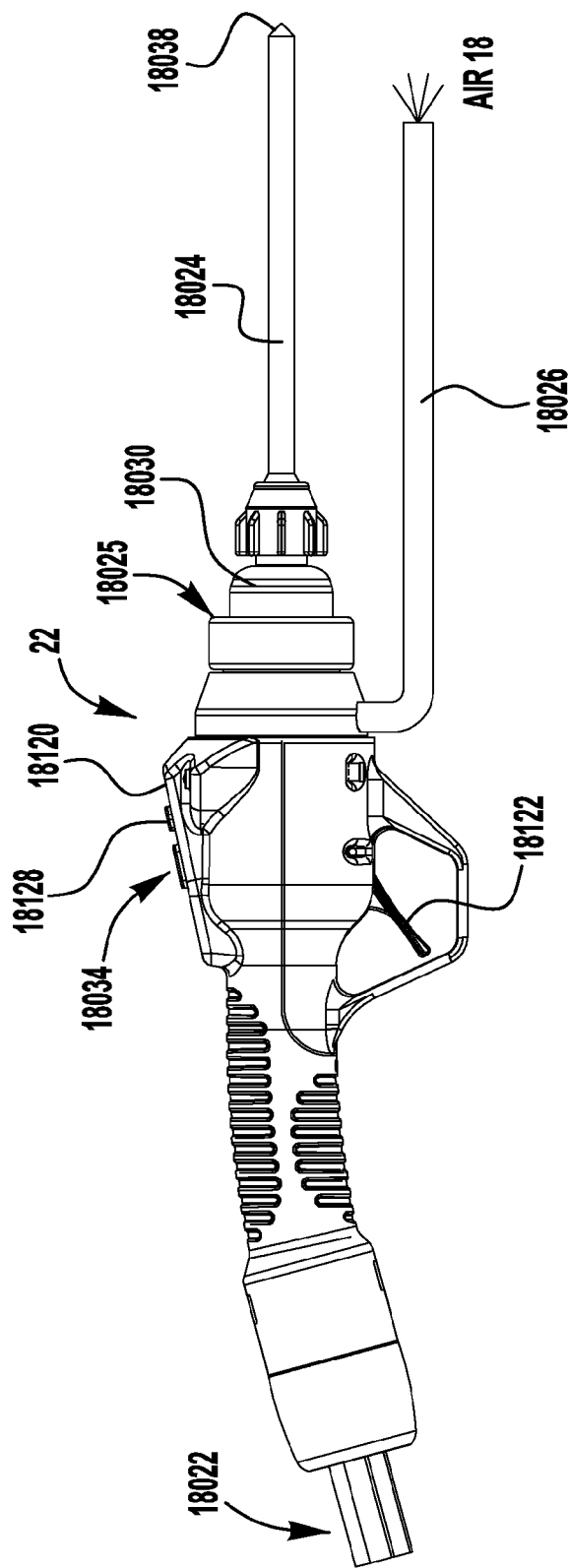
FIG. 19 is a side view of the applicator shown in FIG. 18.
Figure 20:
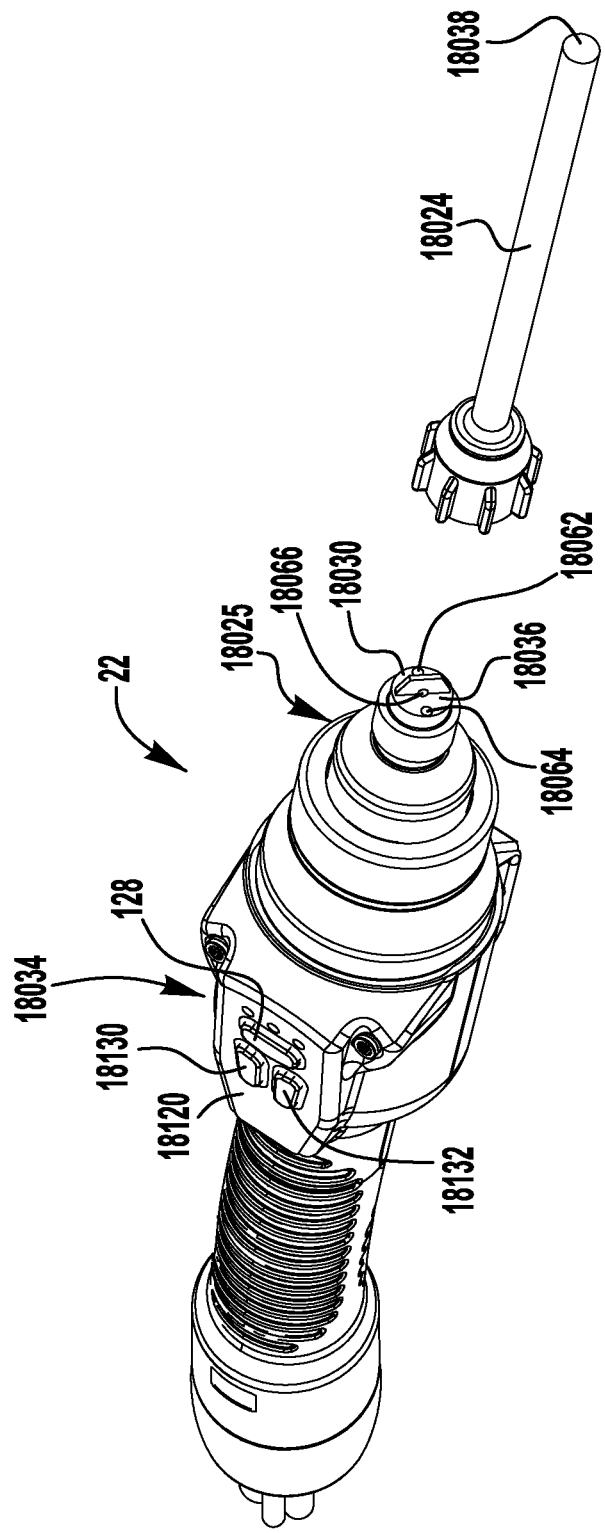
FIG. 20 is an exploded perspective view of the applicator shown in FIG. 18 with the nozzle removed.
Figure 21:
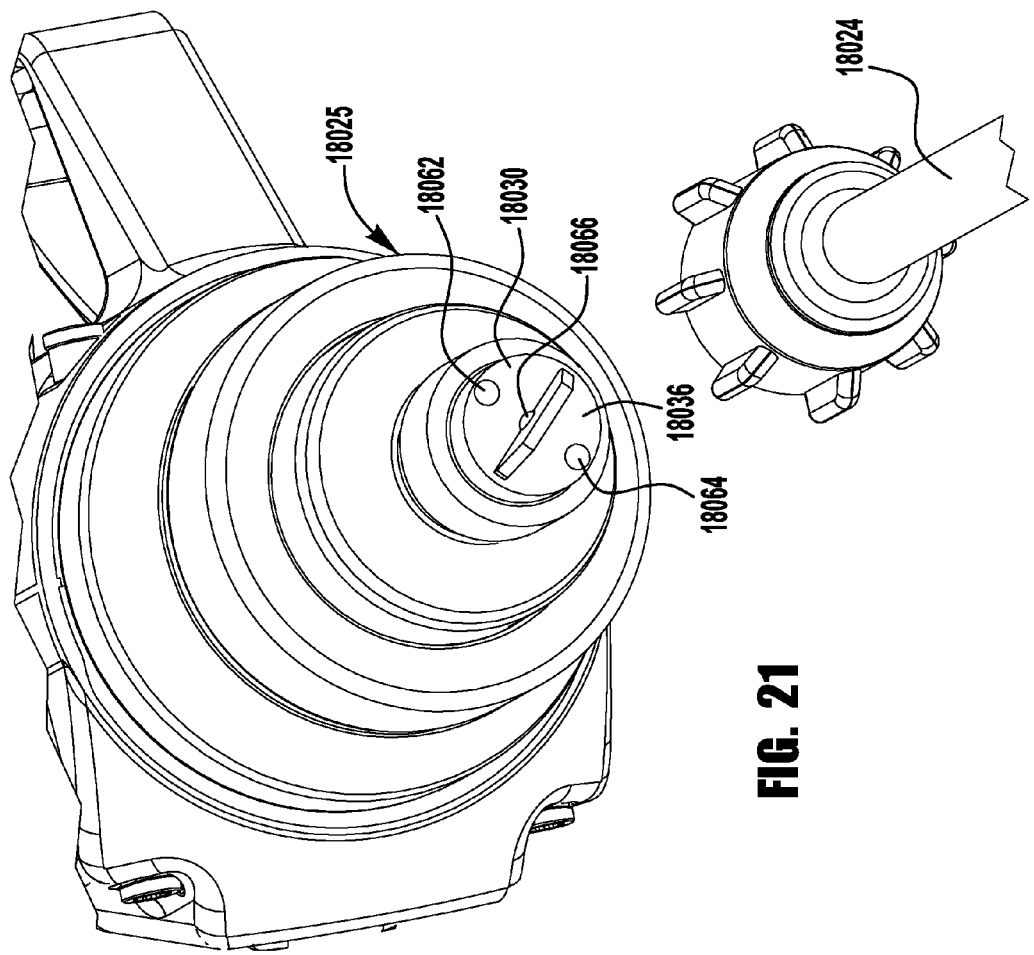
FIG. 21 illustrates an enlarged portion of the applicator shown in FIG. 21.

Referring to FIGS. 18-20, the illustrated applicator 22 includes the nozzle 18024, a manifold 18030, a valve assembly 18032, and a control assembly 18034. The nozzle 18024 mounts to the manifold 18030 and receives the first and second parts 24, 26 of the foam or the purge fluid 18016 from an end 18036 of the manifold 18030 (See FIG. 20). The nozzle 18024 includes a tortuous inner surface that mixes the first and second parts 24, 26 as the foam material travels toward an outlet 18038 of the nozzle 18024. One acceptable nozzle is a Sulzer QUADRO™ mixer available from Sulzer Ltd.

Figure 24:
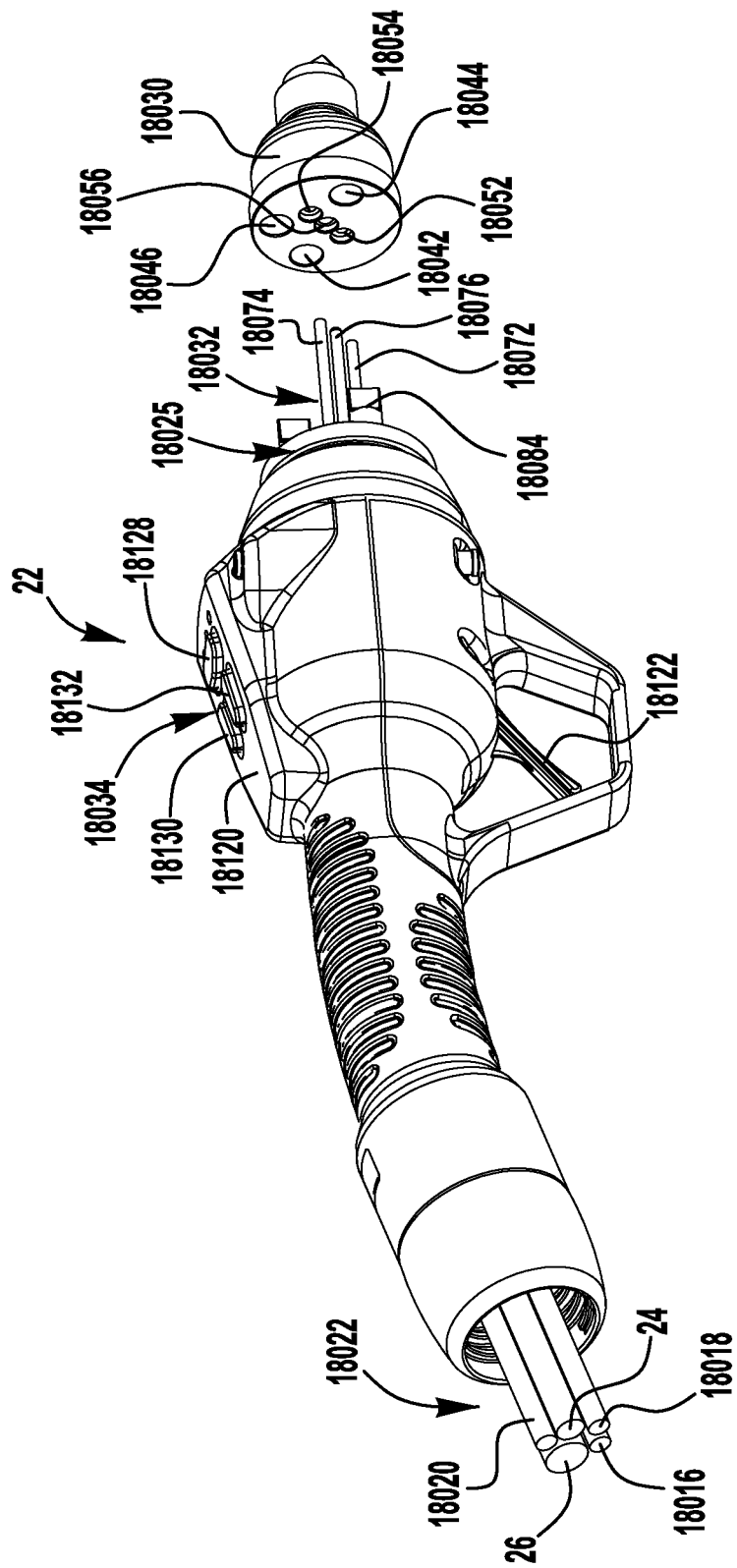
FIG. 24 is another exploded perspective view of the applicator shown in FIG. 18 showing a manifold separated from a valve assembly.
Figure 25:
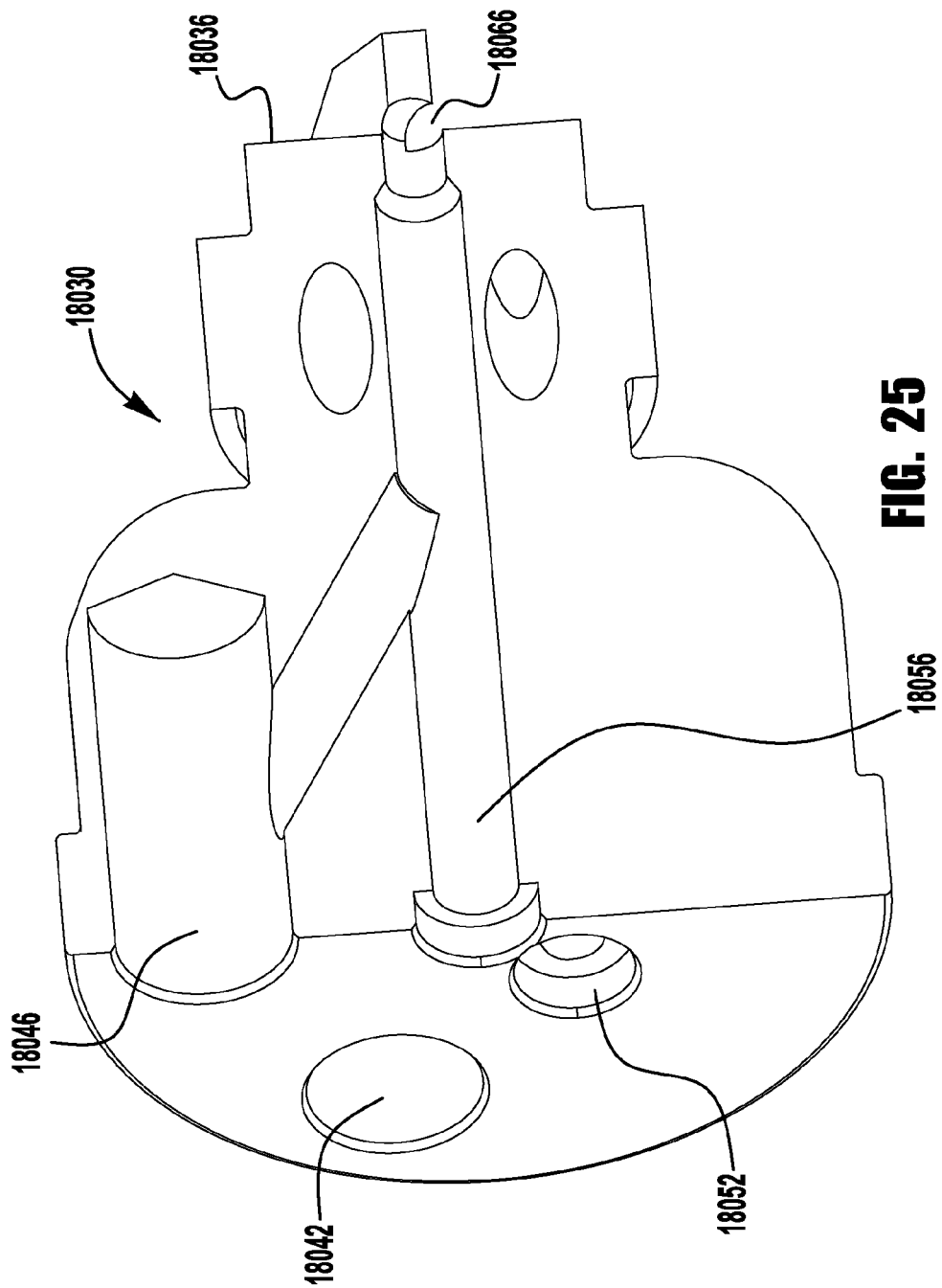
FIG. 25 is a sectioned perspective view taken along the plane indicated by lines 25-25 in FIG. 24.

Referring to FIGS. 24 and 25, the manifold 18030 is a single piece that includes a first foam part input 18042, a second foam part input 18044, a purge input 18046, a first foam part valve stem receiver 18052, a second foam Val stem receiver 18054, a purge valve stem receiver 18056, a first foam part output 18062, a second foam part output 18064, and a purge output 18066. The first foam part input 18042 receives the supply of the first part 24 of the foam. The second foam part input 18044 receives the supply of the second part 26 of the foam. The purge input 18046 receives the supply of the purge fluid 18016. The first foam part valve stem receiver 18052 receives a first foam part valve stem 18072. The second foam Val stem receiver 18054 receives a second foam part valve stem 18074. The purge valve stem receiver 18056 receives a purge fluid valve stem 18076. The first and second foam part valve stems 18072, 18074 are retracted to allow the first foam part 24 to flow from the first foam part input 18042 to and out of the first foam part outlet 18062 and to allow the second foam part 26 to flow from the second foam part input 18044 to and out of the second foam part outlet 18064. The purge valve stem 18076 is retracted to allow the purge fluid to flow from the purge fluid input 18046 to and out of the purge fluid outlet 18066.

Figure 22:
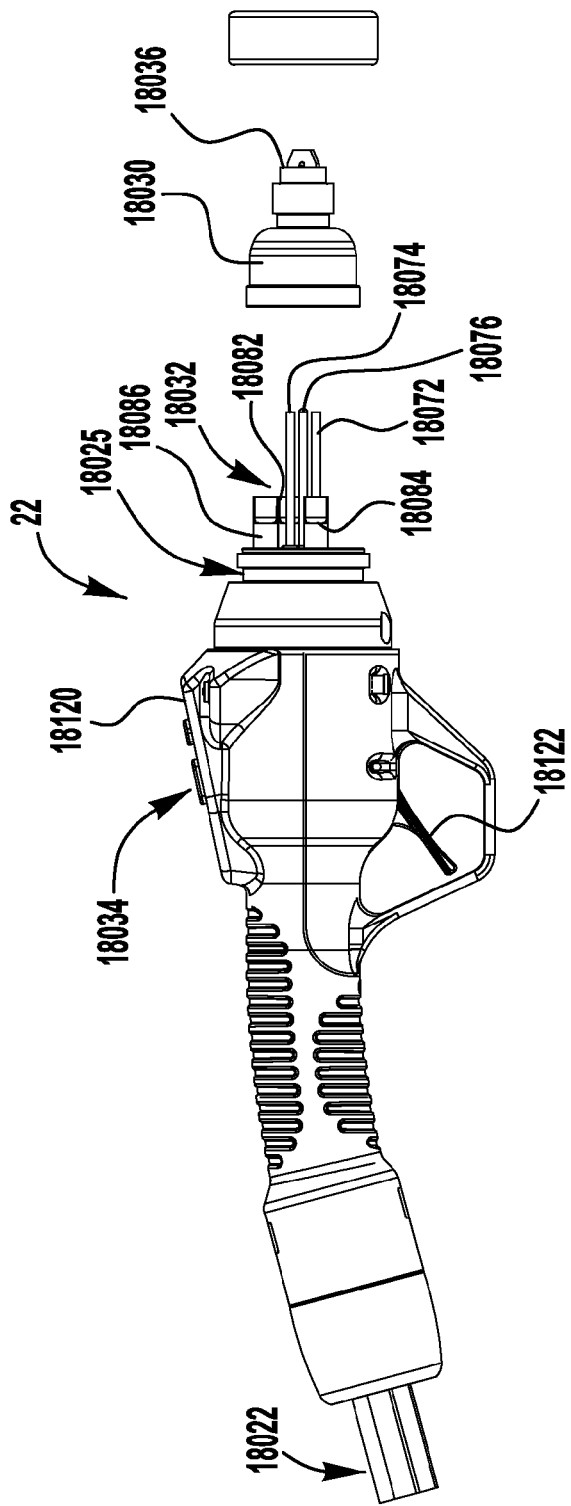
FIG. 22 is an exploded side view of the applicator shown in FIG. 18 showing a manifold separated from a valve assembly.
Figure 23:
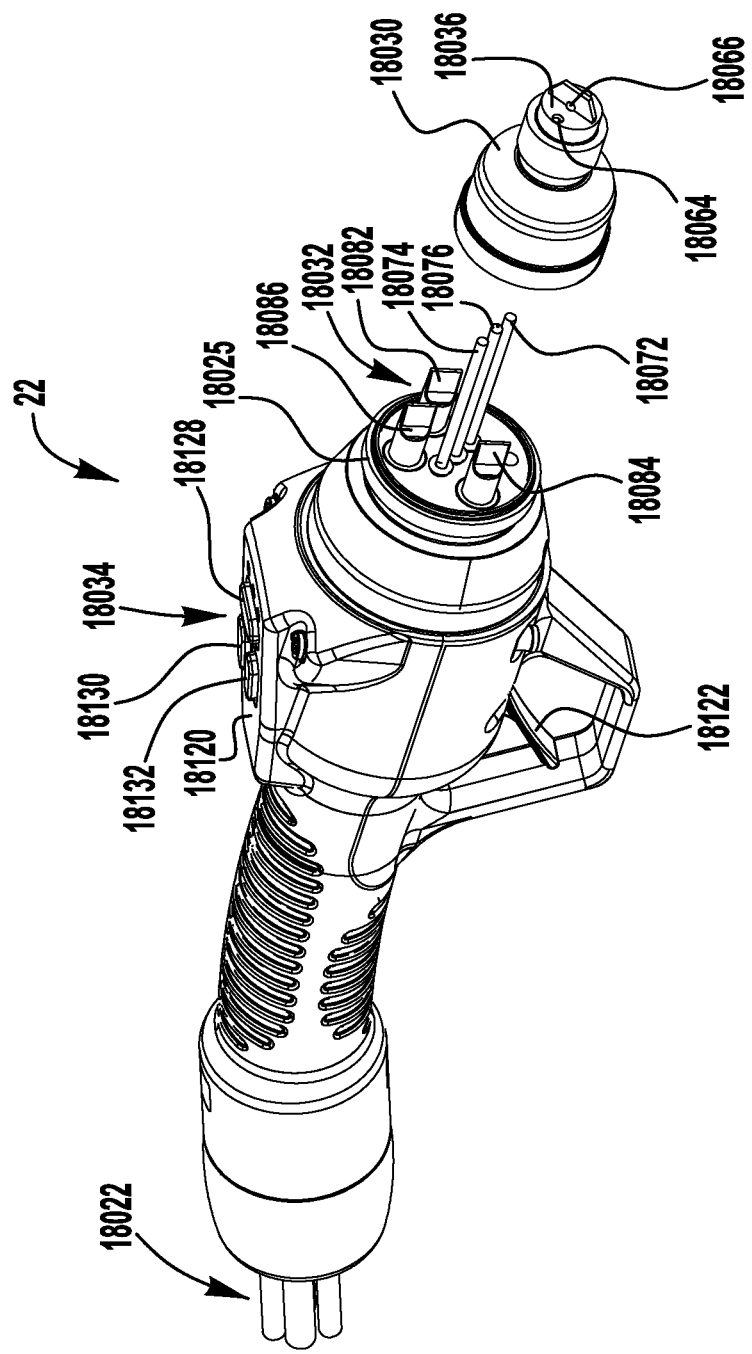
FIG. 23 is an exploded perspective view of the applicator shown in FIG. 18 showing a manifold separated from a valve assembly.

Referring to FIGS. 22 and 23, the valve assembly 18032 includes a first foam part check valve 18082, a second foam part check valve 18084, a purge check valve 18086, the first foam part valve stem 18072, the second foam Val stem 18074, and the purge valve stem 18076. The check valves 18082, 18084, 18086 prevent any of the material that has been provided into the manifold 18030 and/or nozzle 18024 from flowing back into the supplies of the first part 24 of the foam, the second part 26 of the foam, or the purge fluid 16. As such, the check valves 18082, 18084, 18086 prevent the materials in the hoses 18022 from being contaminated, which could cause the hoses to become clogged.

Figure 27:
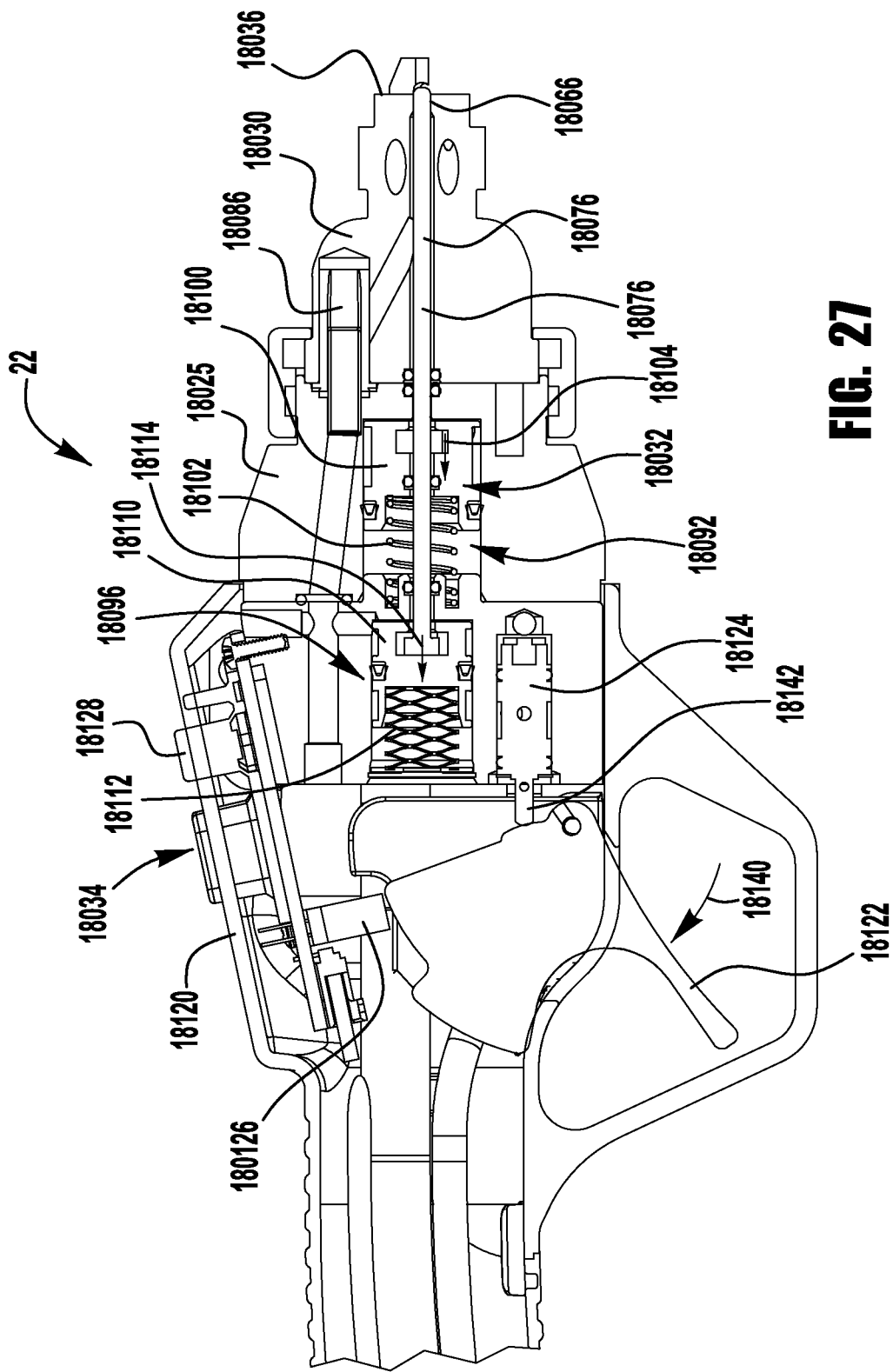
FIG. 27 is an enlarged portion of FIG. 26.

Referring to FIGS. 23, and 27, the first foam part valve stem 18072, and the second foam Val stem 18074 (Valve stems shown in FIG. 23) are controlled by a first air operated valve 18092 (Valve shown in FIG. 27). The air operated valve 18092 includes a piston 18100 and a return spring 18102. When the air operated valve 18092 is activated, the piston 18100 moves in the direction indicated by arrow 18104 and pulls the valve stems 18072, 18074 (not shown in FIG. 27) away from the first foam part output 18062 and the second foam part output 18064 outlet. This movement opens first foam part outlet 18062 and the second foam part outlet 18064 to allow the first foam part 24 and the second foam part 26 to flow out the end 18036 of the manifold 18030 and into the nozzle 18024. When the air operated valve 18092 is deactivated, spring 18102 moves the piston 18100, which in turn moves the valve stems 18072, 18074 (not shown in FIG. 27) back to the closed positions.

Figure 28:
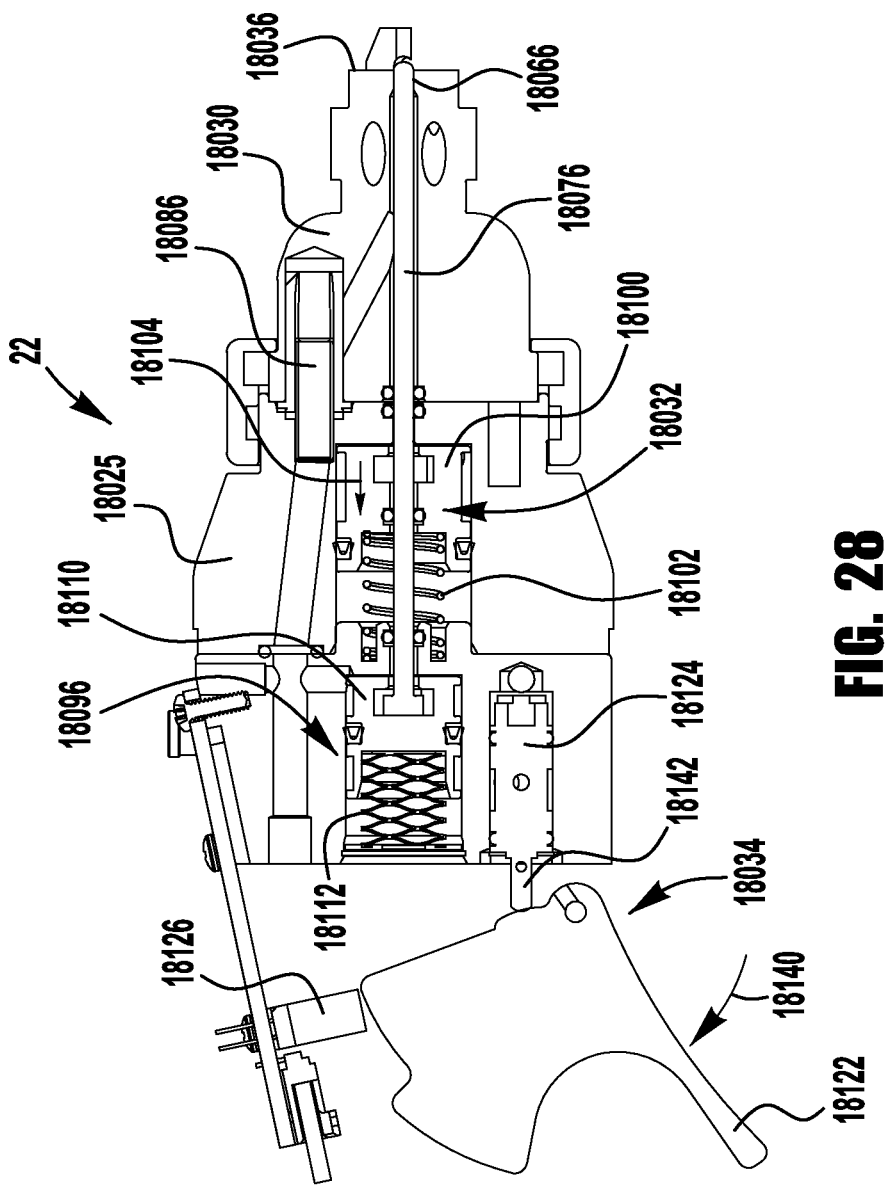
FIG. 28 is a view similar to FIG. 27 with a housing removed to simplify the drawing.
Figure 29:
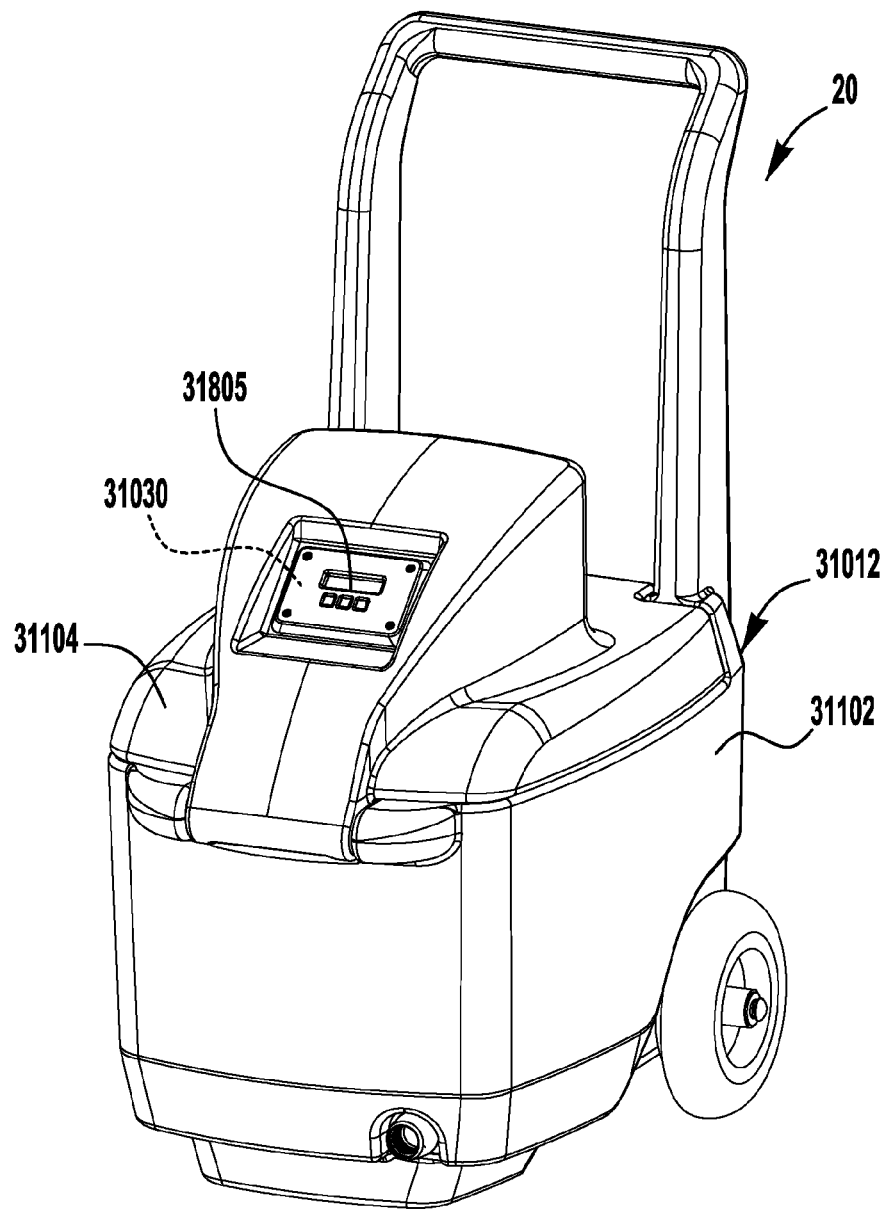
FIG. 29 is a perspective view of an exemplary embodiment of a supply machine for providing material to the applicator.
Figure 30:
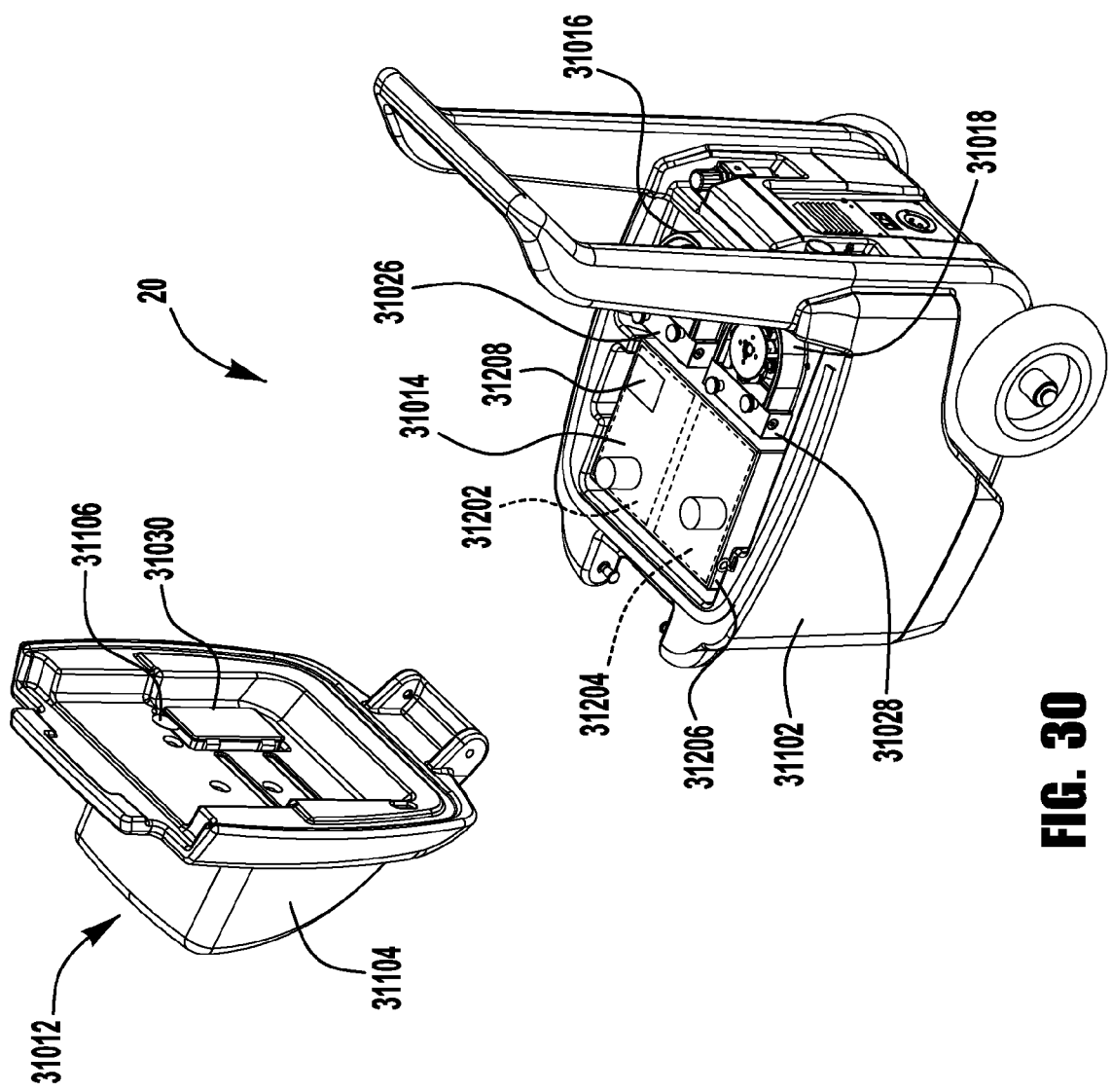
FIG. 30 is an exploded perspective view of the supply machine shown in FIG. 29 showing a housing top rotated and moved away from a housing base.
Figure 31:
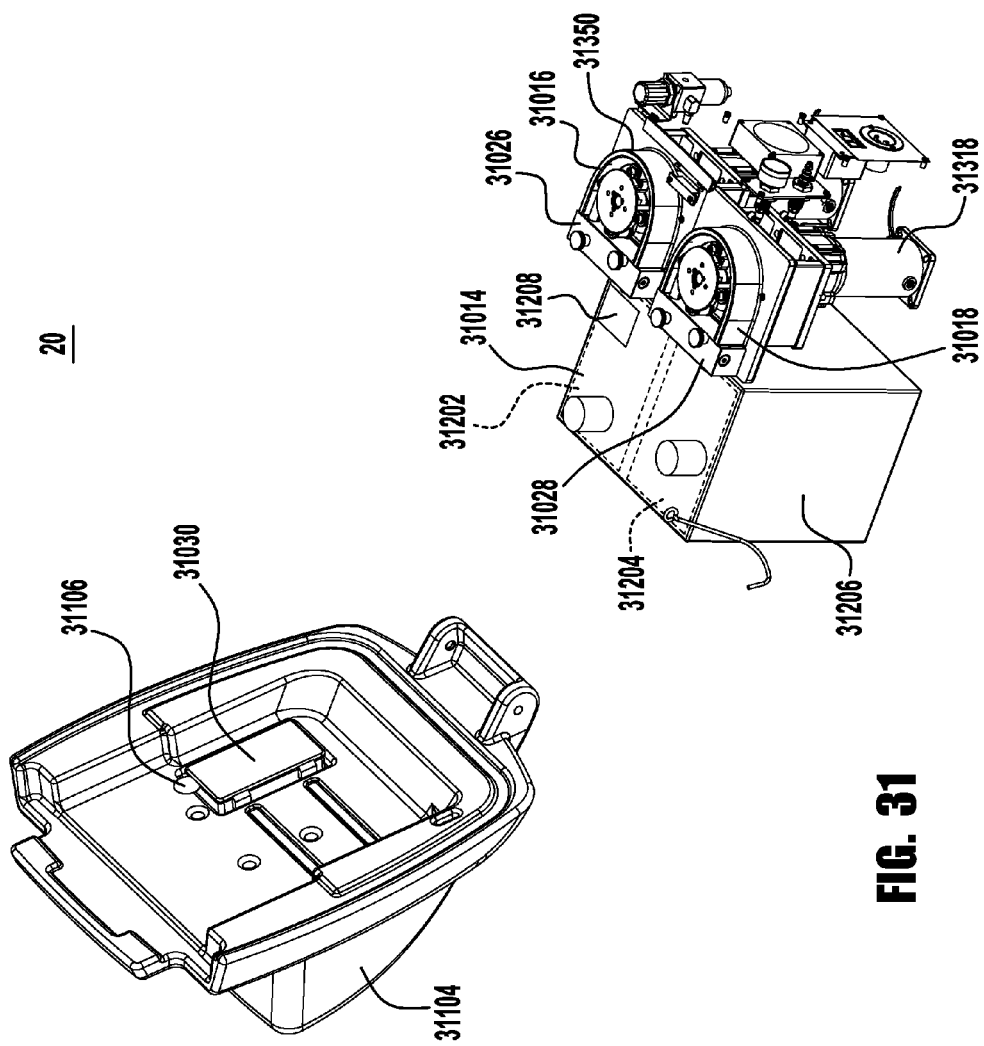
FIG. 31 is a view similar to FIG. 30 with the housing base removed.
Figure 32:
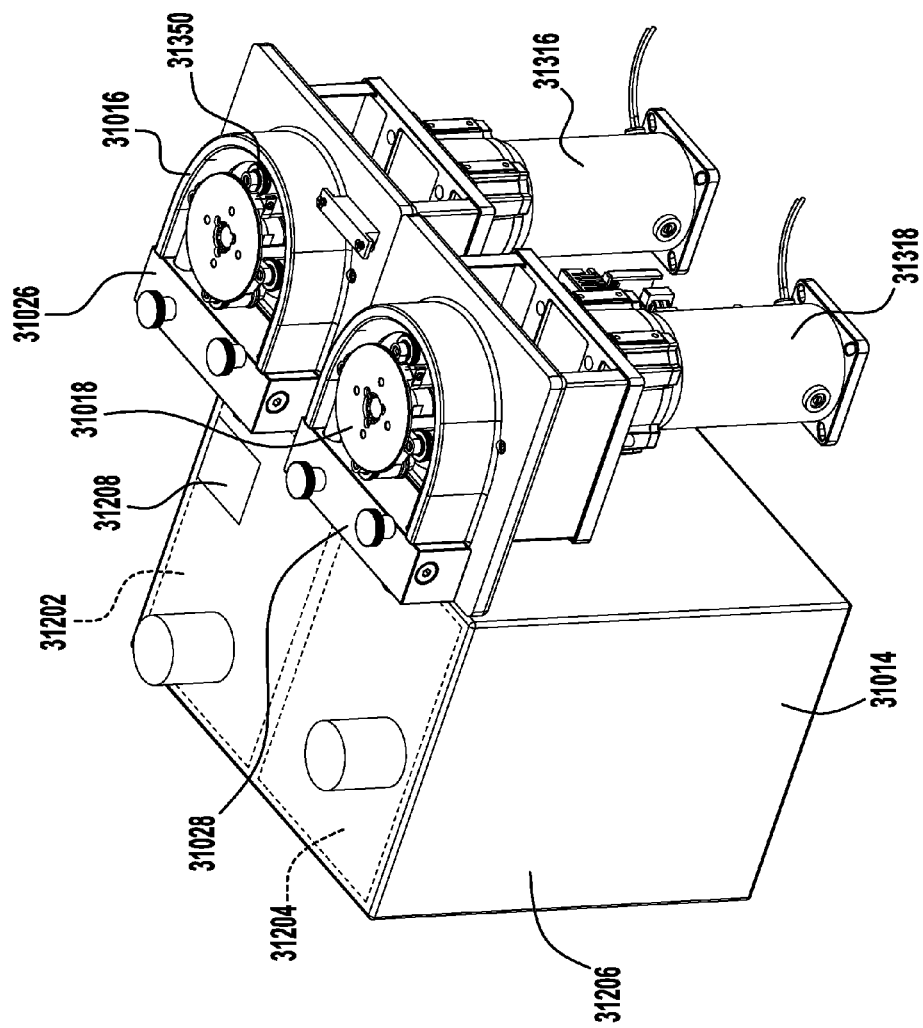
FIG. 32 is a view similar to FIG. 31 with the housing top removed.

Referring to FIGS. 27 and 28, the purge valve stem 18076 is controlled by a second air operated valve 18096. The air operated valve 18096 includes a piston 18110 and a return spring 18112. When the fluid operated valve 18096 is activated, the piston 18110 moves in the direction indicated by arrow 18114 and pulls the valve stems 18076 away from the purge outlet 18066. This movement opens purge outlet to allow the purge fluid 18016 to flow out the end 18036 of the manifold 18030 and into the nozzle 18024. When the fluid operated valve 18096 is deactivated, spring 18112 moves the piston 18110, which in turn moves the valve stems 18076 back to the closed position.

Figure 26:
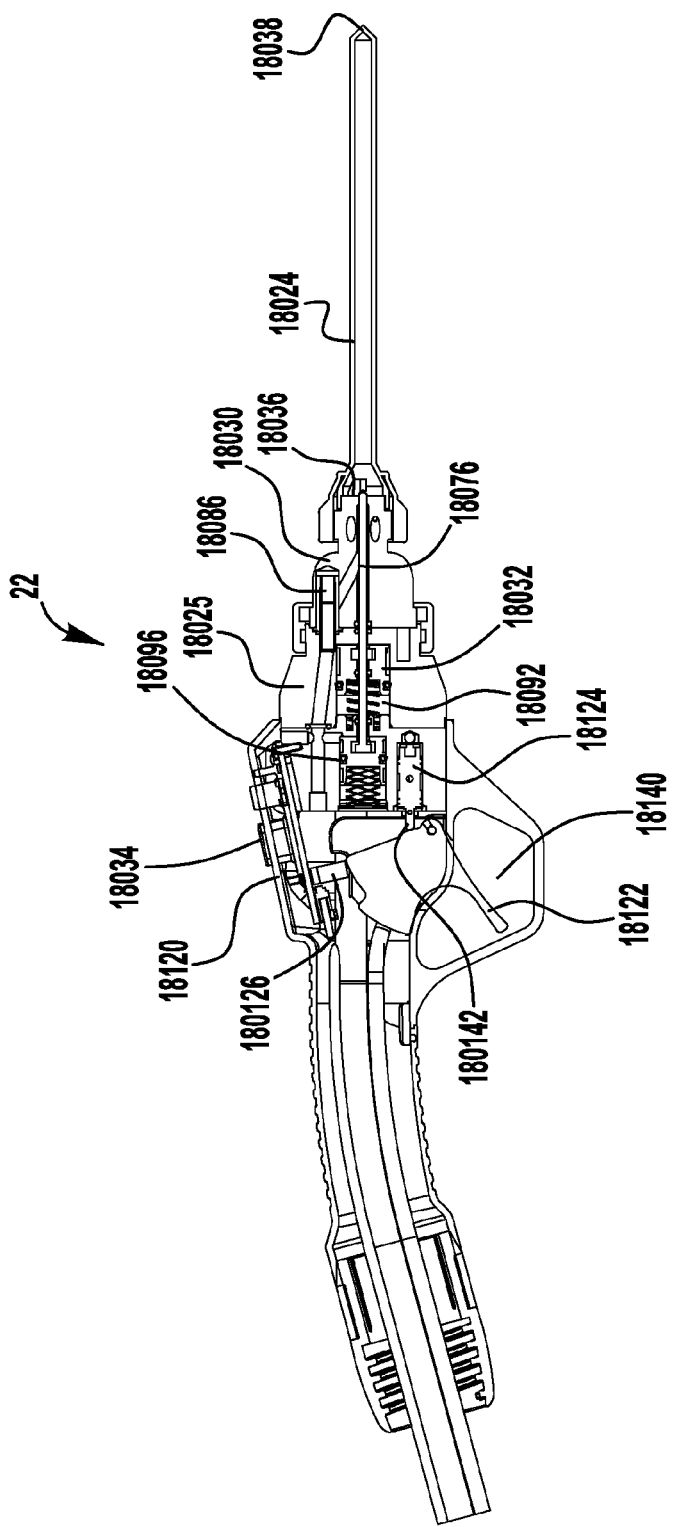
FIG. 26 is a sectional view taken along the plane indicated by lines 26-26 in FIG. 18.

Referring to FIGS. 26-28, the control assembly includes a control panel 18120, a trigger 18122, an air switch 18124, and a trigger position sensor 18126. Referring to FIG. 18, the control panel includes a foam activation and speed control button 18128, a purge button 18130, and a cleaning air button 18132. The foam activation and speed control button 18128 is operated to place the applicator in one of two or more activated states having different dispense speeds or a deactivated state. The air switch 18124 controls application of the pressurized control air 18020 to the first air operated valve 18092. The trigger position sensor 18126 controls pumps 1016, 1018 (described in more detail with reference to FIGS. 30-34 below), which supply the first and second foam parts through hoses 18022 and through the applicator 22. The trigger 18122 selectively actuates the air switch 18124 and the trigger position sensor 18126. Referring to FIGS. 26-28, when the trigger 18122 is squeezed as indicated by arrow 18140, the trigger presses an actuator 18142 of the air switch 18124 and causes the trigger position sensor 18126 to provide a pump command signal to the pumps 1016, 1018. The air switch 18124 applies air to the piston 18110 to retract the valve stems 18072, 18074 and thereby allows the first and second foam parts 24, 26 to flow out of the manifold and into the nozzle 24. Simultaneously, the trigger position sensor 18126 provides the command signal to the pumps to thereby control the amounts of the first and second parts 24, 26 of the foam that are mixed in the nozzle and dispensed by the nozzle.

Operation of the Dispenser Illustrated by FIGS. 18-28
Foam activation and speed control button 18128—Pressing the button 18128 toggles the state of the applicator 22 between a deactivated state (i.e. the foam parts are not dispensed when the trigger is pulled in this state), an activated/first speed state (foam parts are dispensed at a first rate when the trigger is pulled), and an activated/second speed state (foam parts are dispensed at a second rate when the trigger is pulled).
Trigger 18122—Causes the foam parts to be dispensed when the applicator is in one of the activated states.
Purge Button 18130—Pressing the Purge button when the applicator 10 is in the deactivated state causes the purge valve stem 18076 to be pulled back by the piston 18110, which in turn causes purge fluid 3014 to be dispensed through the manifold 18030 and the nozzle 24. The purge fluid 3014 cleans out the mixed foam in the nozzle 28 and at the end 18036 of the manifold 18030, so that the nozzle can be reused and the end of the manifold does not become obstructed.
Cleaning air button 18132—Pressing the cleaning air button causes pressurized cleaning air to be blown through the cleaning air nozzle 18200.

In the exemplary embodiment illustrated by FIGS. 29-34, the foam supply machine 20 includes a housing 31012, two-part foam container 31014, a first foam part pump 31016, a second foam part pump 31018, a first foam part manifold 31026, a second foam part manifold 31028, and one or more controllers 31030. The machine 31020 also includes one or more pressurized air supply lines (See FIGS. 6 and 8-13 for example) and a pressurized purge fluid line (See FIG. 3 for example). An external air compressor may be used to provide air pressure that is utilized in any of the embodiments disclosed by this application.

When the machine 31020 is activated and the trigger 18122 of the applicator is pressed, the controller 31030 causes the first foam part pump 31016 and the second foam part pump 31018 to deliver the foam parts to the applicator 22 in a predetermined ratio.

In the exemplary embodiment illustrated by FIGS. 29-34, the housing 31012 includes a base 31102 and a lid 31104. The base contains the two-part foam container 31014, the first foam part pump 31016, the second foam part pump 31018, the first foam part manifold 31026, and the second foam part manifold 31028. The lid 31104 includes a foam container sensor 31106 and may house one or more of the controllers 31030. The sensor 31106 may be included in a controller 31030 that is housed by the lid 31104.

The two-part foam container 31014 includes a first foam part container 31202, a second foam part container 31204, and a box 31206 that houses the foam part containers. The first and second foam part containers 31202, 31204 are sealed and are not opened to the atmosphere during the process of connecting the containers with the pumps 31016, 31018, such that no dirt or other contaminants can enter the containers 31202, 31204. A sensed device 31208, such as a an RFID tag or other remotely readable information storage arrangement is disposed on the box 31206. A bar code could also be used. The sensed device 31208 is positioned on the box 31206, such that if the box is installed correctly in the base 31102, the sensed device 31208 is sensed by the sensor 31106 when the lid 31104 is closed. If the box 31206 is not positioned or installed correctly in the base 31102, the sensed device 31208 is not sensed by the sensor 31106 when the lid 31104 is closed. When the sensed device 31208 is not sensed by the sensor 31106, the controller 31030 prevents the machine 31010 from operating, thereby preventing damage to the machine due to incorrect installation of the two-part foam container 31014. For example, the sensed device 31208 and sensor 31106 can prevent the machine from operating if the first foam part container 31202 is connected to the second foam part pump 31018 and the second foam part container 31204 is connected to the first foam part pump 31016.

The sensed device 31208 also contains operation parameters for the particular foam parts that are supplied in the box 31206. The ratio of the amount of the first foam part to the amount of the second foam part to be delivered by the machine 31010 is provided by the sensed device 31208 to the controller 31030 through the sensor 31106 each time the lid 31104 is closed. This ratio information is used to control the ratio of the speed of the first pump to the speed of the second pump. This ensures that the proper ratio of the foam parts is dispensed by the machine 31010 each time the two-part foam container 31014 might be changed. Different two part foam containers 31014 may have different operating parameters, such as different mix ratios. Other operating parameters for the boxed foam parts may also be provided by the sensed device 31208 and stored by the controller 31030. For example, the batch number of the box 31206, temperature compensation information and other operating information, production date, expiration date, etc may be provided by the sensed device 31208.

In the illustrated exemplary embodiment, the first foam part pump 31016 and the second foam part pump 31018 are peristaltic pumps, or other metering pumps that can precisely dispense the foam parts. The illustrated peristaltic pumps 31016, 31018 include retractable rollers 31350, 31352 (See FIG. 33). The retractable rollers 31350, 31352 can be retracted in the reverse direction to allow the tube 34000 of the peristaltic pump to be easily removed and replaced. The first foam part pump 31016 and the second foam part pump 31018 are independently driven by motors 31316 and 31318 respectively. The controller(s) 31030 independently control the motors 31316, 31318 to precisely control the flow of the first foam part from the container 31202 and the second foam part from the container 31204 to the applicator 22. The separate motors 31316, 31318 permit first and second peristaltic pumps 31016, 31018 to operate at different speeds and correspondingly different flow rates An advantage of using a peristaltic pump is that the pump operates externally on conduits 34000. It will be appreciated that at least portions of the conduits are flexible so that fluid therein is moved along the conduit as peristaltic pumps rotate. It will be appreciated that all of conduits of the peristaltic may be flexible. Further, peristaltic pumps 31016, 31018 may be rotary peristaltic pumps as illustrated. Or, alternately the peristaltic pumps maybe linear. An advantage of using a peristaltic pump is that the fluids which are being conveyed only travel through the tube portions and manifold 31026 of the pump 31016. Accordingly, minimal clean-up of the pump is required after use. This is particularly an advantage if, for example, a sticky or tacky compound such as an adhesive or mastic is applied. In operation, the pump may be cleaned up by replacing conduits 34000 and cleaning the manifolds 31026, 31028.

Figure 34A:
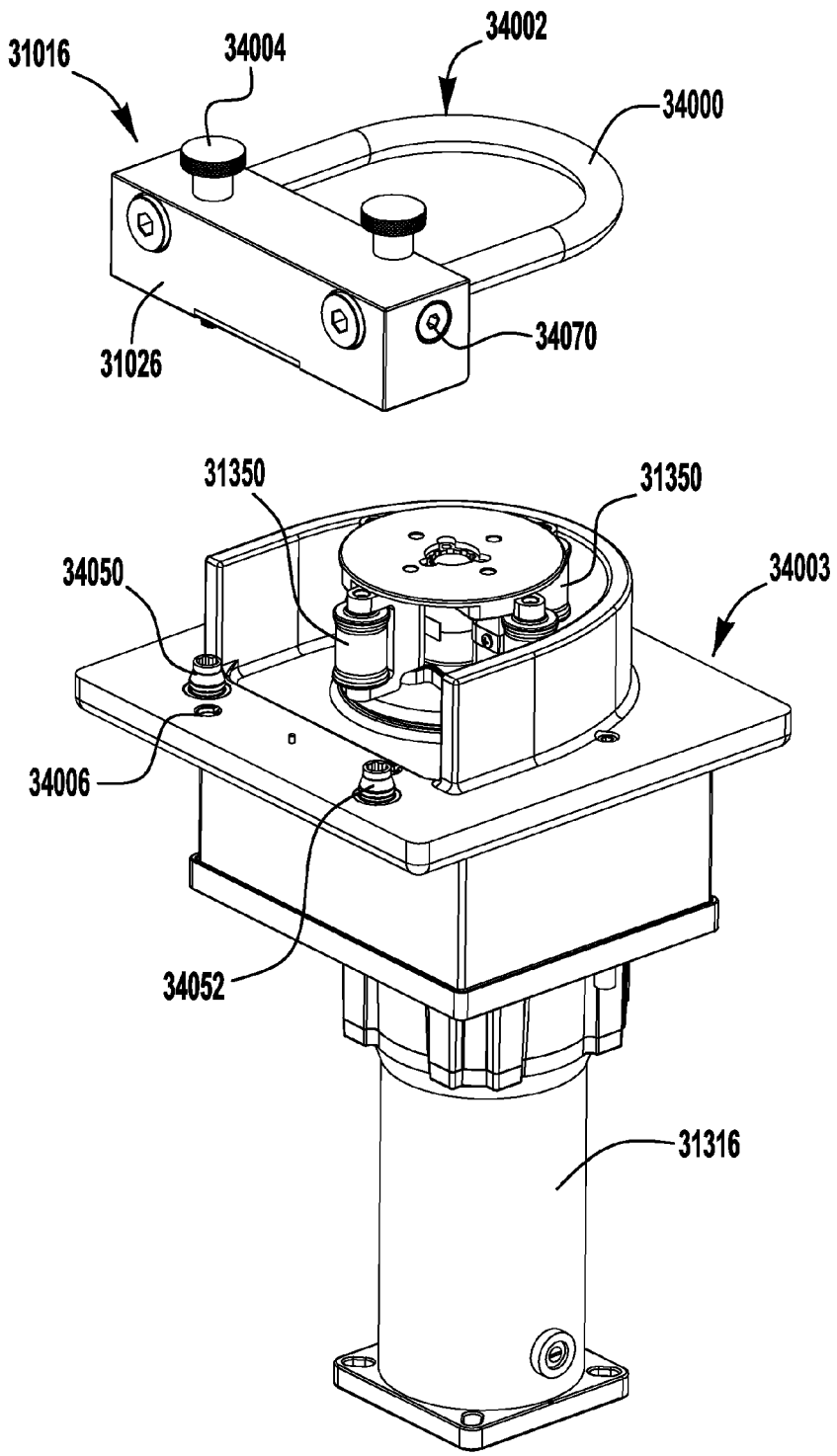
FIG. 34A is a first exploded perspective view showing a manifold assembly separated from a main pump assembly.
Figure 34B:
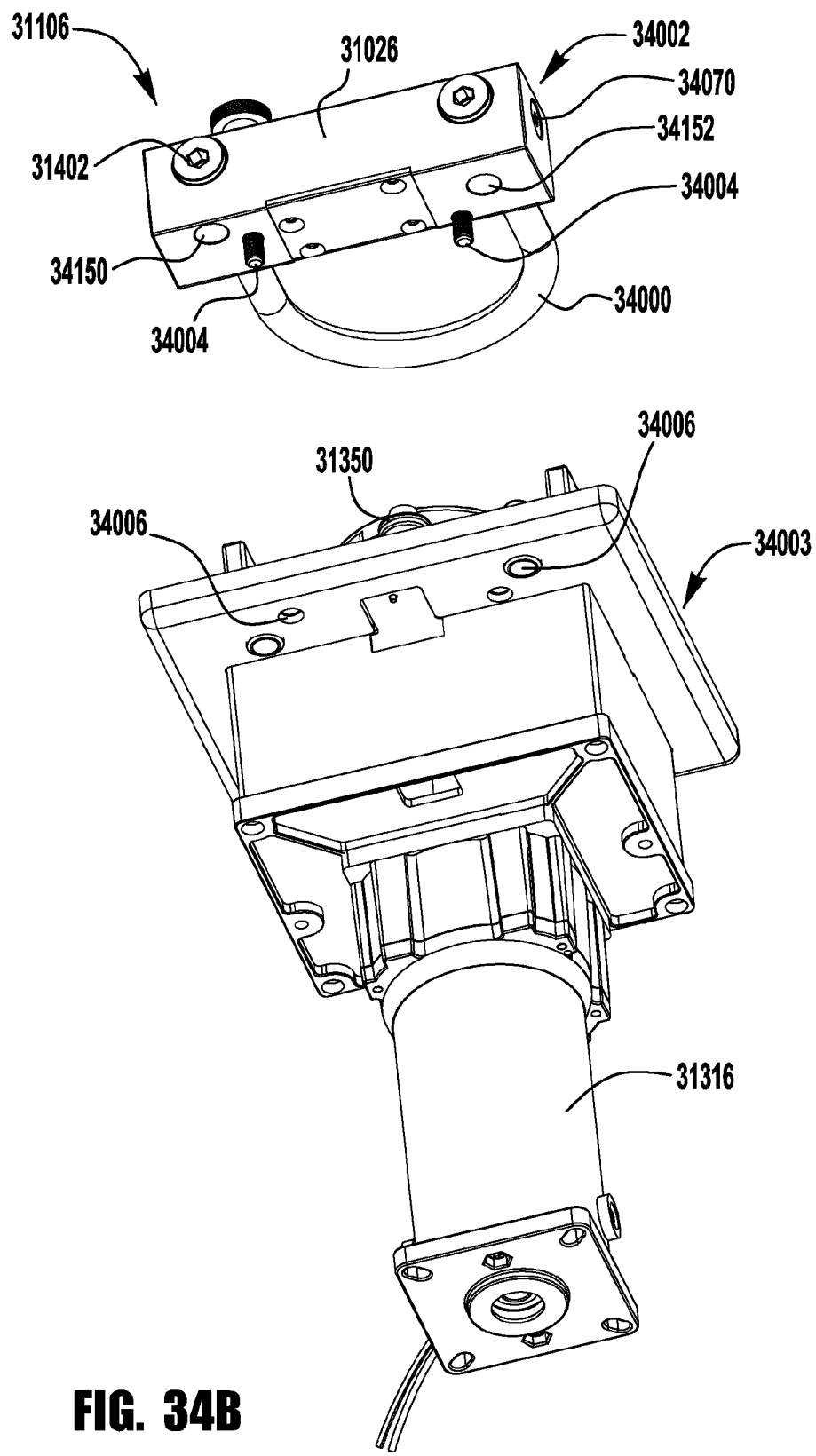
FIG. 34B is a second exploded perspective view showing a manifold assembly separated from a main pump assembly.

Referring to FIGS. 34A and 34B, in one exemplary embodiment, the conduit 34000 and the manifold 31026 are removable from a main assembly 34003 of the pump 31016 as a unit 34002. This unitary removal allows a replacement conduit 34000 and manifold 31026 to be quickly installed on the pump 31106, while a used manifold and conduit assembly 34002 is serviced. In the illustrated embodiment, the manifold assembly 34002 is secured to the remainder 34003 of the pump assembly by fasteners 34004 that engage threaded holes 34006.

Figure 33:
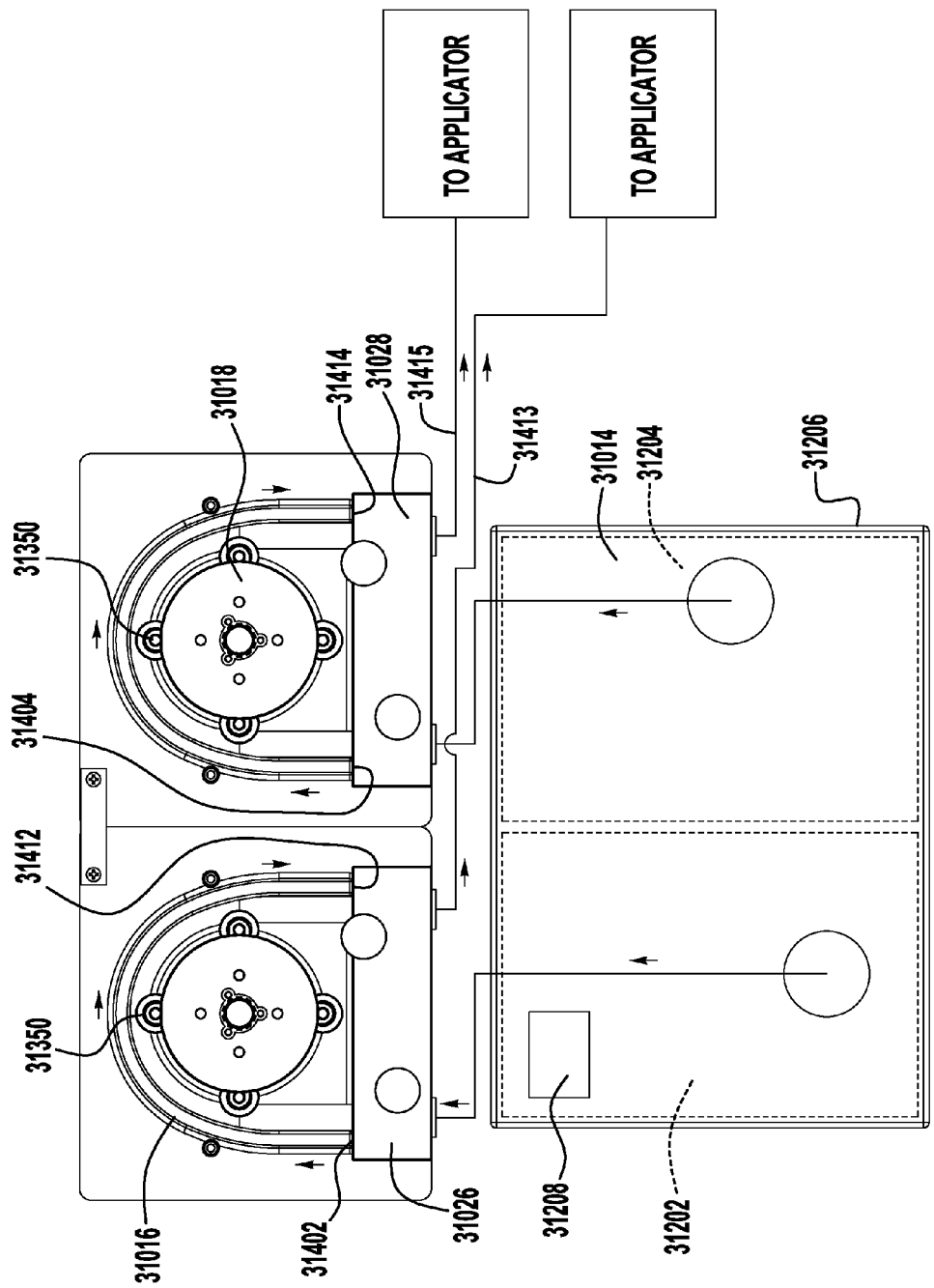
FIG. 33 is a top view of a material container and pumps of the supply machine illustrated by FIG. 29.

Referring to FIG. 33, the first foam part container 31202 is connected to the inlet 31402 of the first foam part pump 31016 by the first foam part manifold 31026. The first foam part manifold also connects the outlet 31412 of the first foam part pump 31016 to a hose 31413 that supplies the first foam part to the applicator 22. The second foam part manifold 31028 is connected in the same manner. That is, the second foam part container 31204 is connected to the inlet 31404 of the second foam part pump 31018 by the second foam part manifold 31028. The second foam part manifold 31028 also connects the outlet 31414 of the second foam part pump 31018 to a hose 31415 that supplies the second foam part to the applicator 22.

Each manifold 31026, 31028 includes a check valve, a pulse arrestor, pressure transducers, a purge port and valve, and a memory module. The check valve prevents foam material from back flowing from the pump to the toward the supply container. The pulse arrestor ensures that the peristaltic pumps provide a smooth flow of the foam material to the applicator, without significant pressure spikes.

An upstream or suction side transducer 34050 and a downstream or pressure side transducer 34052 may be included. The suction side transducer measures the pressure at the inlet of the pump and is used to determine when the foam part container 31202 or 31204 is empty. The pressure side transducer measures the pressure at the outlet of the pump and is used to determine whether there is a downstream blockage in the hose or the applicator 22. Referring to FIG. 34B, in the illustrated embodiment the manifold 31026 includes a port 34150 that receives the inlet side or vacuum pressure sensor 34050 and a port 34152 that receives the outlet side pressure sensor 34052. The pressure sensors 34050 are mounted on the main pump assembly, but monitor the inlet pressure and the outlet pressure inside the manifold when the manifold is assembled to the main pump assembly with the fasteners 34004.

The pressure sensors 34050, 34052 can be used to monitor a variety of operating conditions of the supply machine 20. When the container 31202, contains some material, operation of the pump 31016, results in a normal, relatively low pressure difference (as compared to atmosphere) being sensed by the pressure sensor 34050. When the container 31014, becomes empty, continued operation of the pump 31016, results in a high vacuum being sensed by the vacuum sensor 34050. In an exemplary embodiment, when the sensor 34050 senses the high vacuum, operation of the pump 1016 is stopped.

The downstream or pressure sensors 34052 can be used to determine when there is a blockage anywhere between the pump 31016 and the end 18038 of the nozzle 18024. The most common blockage is in the nozzle 18024. After use, if the nozzle is not purged as discussed below, the materials will cure in the nozzle. When there is no blockage, operation of the pump 31016, results in a normal, relatively low pressure difference (as compared to atmosphere) being sensed by the pressure sensor 34052. When there is a blockage, continued operation of the pump 31016, results in a high pressure being sensed by the pressure sensor 34052. In an exemplary embodiment, when the sensor 34052 senses the high pressure, operation of the pump 1016 is stopped. A blockage of the nozzle 28 is indicated when both the sensors 34052, 34062 sense a high pressure. A blockage of a line and not the nozzle 28 is indicated when one of the sensors 34052, 34062 senses a high pressure and the other sensor senses a normal pressure.

Referring to FIGS. 34A and 34B, in the illustrated embodiment the manifold 31026 includes a purge valve 34070. The purge valve 34070 allows material in the conduit 34000, the manifold 31026 and the line leading up to the conduit to be purged as will be described in more detail below. The purge port and valve are used to "burp" or remove an air bubble in the line when the two-part foam container is replaced.

In an exemplary embodiment, the purge valve 34070 includes a sensor, such as a hall effect sensor, that senses when the purge valve is open. The sensor of the purge valve 34070 may be in direct communication with the pump 31016, or the signal from the sensor may be provided to the controller 31030 that controls the pump. The sensor of the purge valve 34070 causes the pump 31016 to run when the purge valve is open and to stop when the purge valve is closed (assuming the trigger of the applicator is not causing the pump 31016 to run).

The purge valve 34070 allows purging in one easy step. When a new container 31014 of material 24 is attached to the pump 31016, an air bubble may be in the container, the line to the pump, and/or the pump. The air bubble can be removed simply by opening the purge valve 34070. Opening the purge valve 34070 causes the pump 31016 to pump the material in the pump and the line and any air bubble entrained therein out the outlet of the purge valve 34070. Once the air bubbles are removed, the purge valve 34070 is closed and the pump 31016 stops. The supply machine 20 is then operated by the trigger as described herein. In one exemplary embodiment, the machine 20 may be configured to stop the pump 31016, to prevent the purge valve 34070 from being inadvertently left open and the material being pumped out of the container 31014.

The memory module is used to store control parameters, to store data associated with usage of the machine (such as temperatures at which the machine was used, cycles, batch numbers read off of the boxes, etc). The manifold may also include a flow meter, such as an oval gear flow meter. The peristaltic pumps 31016, 31018 can be controlled based on the flow meter or with open loop control. When open loop control is used, the flow rates for the different speeds of the pump and temperature are known. The speed of the motor that drives the pump is controlled based on the known flow rate relationships to control the flow rate of the foam part provided by the pump.

Figure 35:
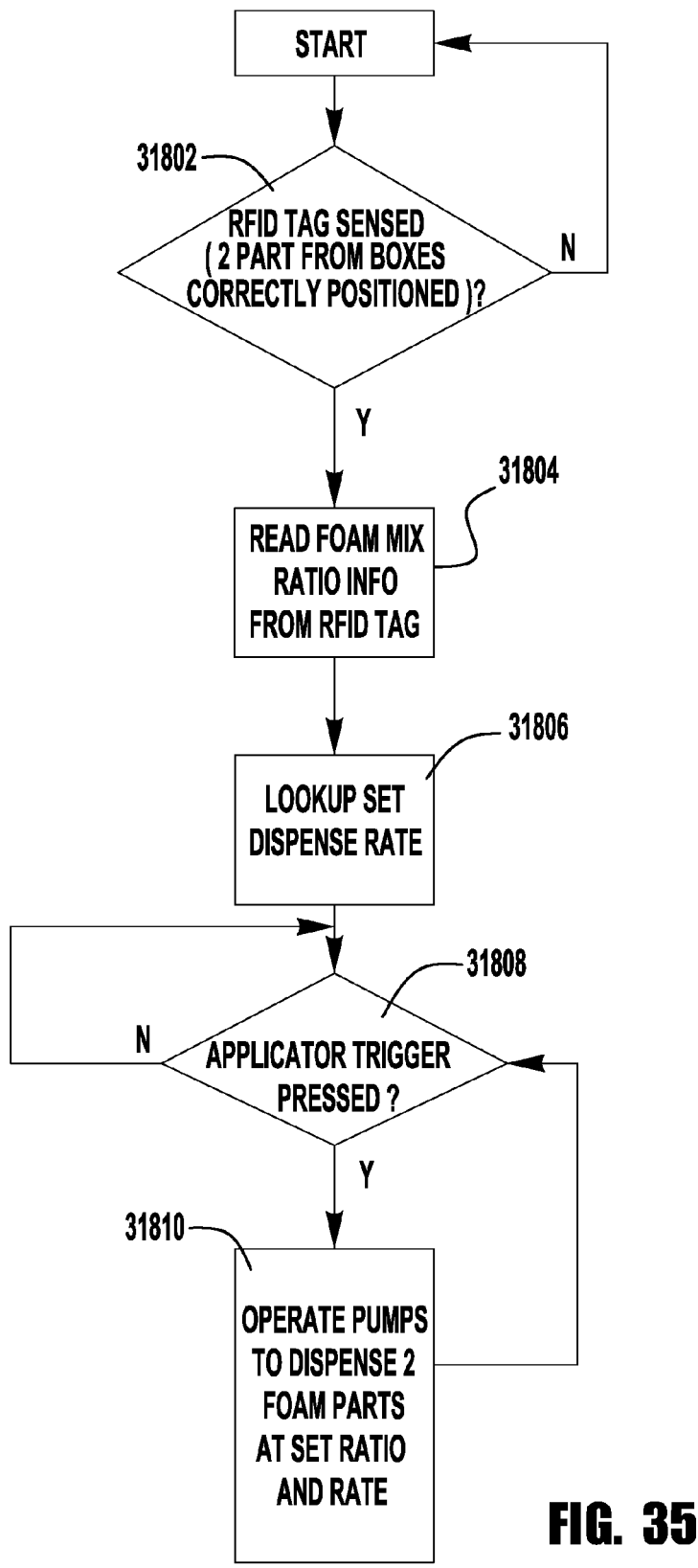
FIG. 35 is a flow chart that illustrates operation of the supply machine shown in FIG. 29.

The machine 20 may be operated in accordance with the method illustrated by FIG. 35. The two-part foam container 31014 is installed in the base 31102 and the lid 31104 is closed. At step 31802, the sensor 31106 attempts to sense the sensed device 31208 on the box 31206 and determine whether the container 31014 is properly installed. If the container 31014 is properly installed, the sensor 31106 reads the foam part mix ratio from the sensed device 31208 at step 31804. The rate or speed at which the foam is to be dispensed is set by the user at an input device 31805 and/or at the applicator 22. At step 31806, the set dispense rate is looked up. At step 31808, the controller determines whether the operator is pressing the trigger of the applicator 22. If the operator is pressing the trigger of the, the controller operates the pumps 31016 to dispense the two foam parts to the applicator 22 at the set ratio and rate at step 31810.

Figure 36:
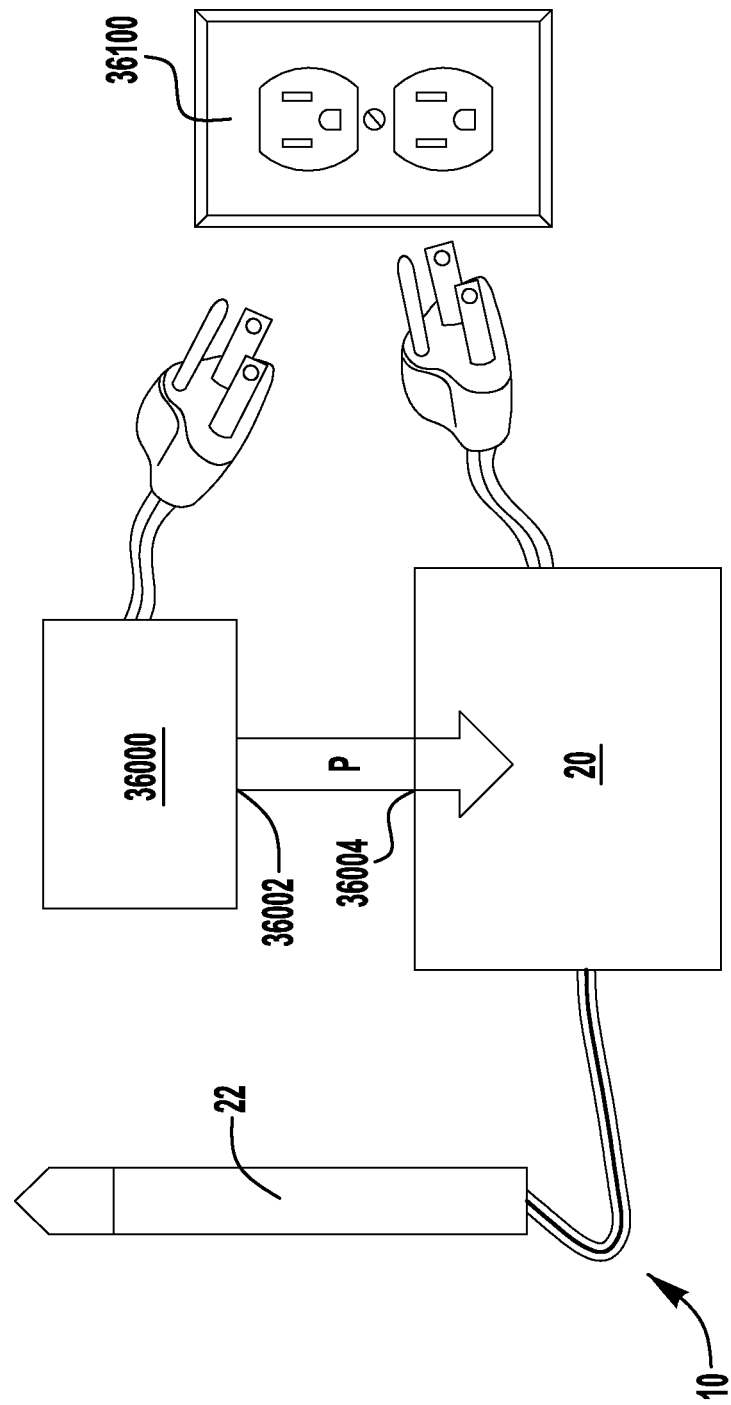
FIG. 36 is a schematic illustration of a supply machine of any of the exemplary embodiments disclosed by this application and an air compressor powered by a single standard electrical outlet.

Referring to FIG. 36, in an exemplary embodiment an external air compressor 36000 is used to provide air pressure P that is utilized by the supply machine 20 and/or the dispenser 22 of the machine 10. A compressed air outlet 36002 of the compressor 36000 is coupled to a compressed air inlet 36004 of the supply machine 20 in the illustrated embodiment. The compressed air from the compressor may be used to provide any of the compressed air for any of the functions mentioned in this application to the machine 10. For example, the compressor 36000 may provide compressed air to supply the purge fluid 3014, to provide the cleaning air 6014, and/or to operate air powered actuator(s) and/or air powered valves of the dispenser. In an exemplary embodiment, the compressor 36000 provides the air at a pressure of 60 to 140 psi, 70 to 130 psi, or 80 to 120 psi.

Referring to FIG. 36, in an exemplary embodiment the power consumption of the machine 10 is controlled to maintain the power consumption at a low enough level that both the machine 10 and the compressor can be plugged into a single electrical outlet 36100 (i.e. powered by a standard electrical circuit). For example, the power consumption of the machine 10 cam be controlled such that both the machine 10 and the compressor 36000 can be powered by a single 110 Volt, 15 Amp AC circuit. In one exemplary embodiment, the machine 10 is powered by a 110 V circuit and the machine draws less than 12 A, less than 10 A, less than 8 A, less than 6 A, between 4 and 12 A, between 5 and 10 A, between 6 and 8 A, or about 6 A.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, hardware, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

While the present invention has been illustrated by the description of embodiments thereof, and while the embodiments have been described in considerable detail, it is not the intention of the applicant to restrict or in any way limit the scope of the invention to such detail. Additional advantages and modifications will readily appear to those skilled in the art. For example, the specific locations of the component connections and interplacements can be modified. Therefore, the invention, in its broader aspects, is not limited to the specific details, the representative apparatus, and illustrative examples shown and described. Accordingly, departures can be made from such details without departing from the spirit or scope of the applicant's general inventive concept.

What is claimed is:

1. An apparatus for mixing and applying a bead of material comprising:
   a supply machine that includes:
   a first container;

a first pump coupled to the first container for metering a first material from the first container to a first line;
a second container;
a second pump coupled to the second container for metering a second material from the second container to a second line; and
an applicator that includes:
a first pneumatically-actuated valve that receives the first material from the first line;
a second pneumatically-actuated valve that receives the second material from the second line;
a nozzle that receives the first and second materials from the first and second valves;
a control in communication with the first pump, the second pump, the first pneumatically-actuated valve, and the second pneumatically-actuated valve, such that activation of the control sends a pump command signal to operate the first pump and the second pump and, simultaneously, sends pressurized control air to open the first pneumatically-actuated valve and the second pneumatically-actuated valve to supply the first and second materials to the nozzle, mix the first and second materials in the nozzle, and dispense a bead of the first and second materials with the nozzle; and
a manifold having a first material inlet, a first material outlet, and a first valve stem receiver, and wherein the first pneumatically-actuated valve includes a first valve stem, and wherein opening the first pneumatically-actuated valve includes retracting the first pneumatically-actuated valve stem from the first valve stem receiver to allow the first material to flow from the first material inlet to the first material outlet.

2. The apparatus of claim 1 wherein:
the supply machine further comprises:
a purge fluid container;
an arrangement for delivering the purge fluid to a purge fluid line; and
the applicator further comprises:
a purge fluid valve that receives the purge fluid from the purge fluid line;
wherein the nozzle receives the purge fluid from the purge fluid valve.

3. The apparatus of claim 2 wherein the apparatus is configured to be selectively placed in an application mode or a purge mode, wherein when the machine is in the application mode, activation of the control prevents operation of the arrangement for delivering the purge fluid and prevents opening of the purge fluid valve.

4. The apparatus of claim 2 wherein the apparatus is configured to be selectively placed in an application mode or a purge mode, wherein when the machine is in the purge mode, activation of the control causes operation of the arrangement for delivering the purge fluid and opening of the purge fluid valve to provide the purge fluid through the nozzle.

5. The apparatus of claim 4 wherein when the machine is in the purge mode, activation of the control prevents operation of the first pump, prevents operation of the second pump, prevents opening of the first valve, and prevents opening of the second valve.

6. The apparatus of claim 1 wherein:
the supply machine further comprises:
a cleaning air tank for containing pressurized air; and
the applicator further comprises:
a cleaning air valve that receives pressurized cleaning air from the cleaning air tank;
a second nozzle that delivers the pressurized air to clean an area where the bead is to be dispensed.

7. The apparatus of claim 6 wherein the applicator is configured such that the applicator can be operated such as to simultaneously apply the bead of material and deliver the pressurized air.

8. The apparatus of claim 1 wherein the manifold further comprises a second material inlet, a second material outlet, and a second valve stem receiver, and wherein the second pneumatically-actuated valve includes a second valve stem, and wherein the first valve stem and the second valve stem are operatively coupled to a piston and movement of the piston away from the manifold retracts the first valve stem from the first valve stem receiver and the second valve stem from the second valve stem receiver to allow the first material to flow from the first material inlet to the first material outlet and the material to flow from the second material inlet to the second material outlet.

9. An apparatus for mixing and applying a bead of material comprising:
a supply machine that includes:
a first container;
a first pump coupled to the first container for metering a first material from the first container to a first line;
a second container;
a second pump coupled to the second container for metering a second material from the second container to a second line; and
a purge fluid container;
an arrangement for delivering the purge fluid to a purge fluid line; and
the applicator further comprises:
a purge fluid valve that receives the purge fluid from the purge fluid line;
wherein the nozzle receives the purge fluid from the purge fluid valve.
an applicator that includes:
a first pneumatically-actuated valve that receives the first material from the first line;
a second pneumatically-actuated valve that receives the second material from the second line;
a nozzle that receives the first and second materials from the first and second valves;
a control in communication with the first pump, the second pump, the first pneumatically-actuated valve, and the second pneumatically-actuated valve, such that activation of the control sends a pump command signal to operate the first pump and the second pump and, simultaneously, sends pressurized control air to open the first pneumatically-actuated valve and the second pneumatically-actuated valve to supply the first and second materials to the nozzle, mix the first and second materials in the nozzle, and dispense a bead of the first and second materials with the nozzle; and
a manifold that receives first material from the first line, second material from the second line, and purge fluid from the purge line, the manifold including a first material outlet, a second material outlet, and a purge outlet, wherein the manifold is connected to the nozzle and wherein the purge fluid exits the purge outlet where the first material and the second material first mix in the nozzle.

10. The apparatus of claim 9 wherein the apparatus is configured to be selectively placed in an application mode or a purge mode, wherein when the machine is in the purge mode, activation of the control causes operation of the arrangement for delivering the purge fluid and opening of the purge fluid valve to provide the purge fluid through the nozzle.

11. The apparatus of claim 10 wherein when the machine is in the purge mode, activation of the control prevents operation of the first pump, prevents operation of the second pump, prevents opening of the first valve, and prevents opening of the second valve.

12. The apparatus of claim 9 wherein the apparatus is configured to be selectively placed in an application mode or a purge mode, wherein when the machine is in the application mode, activation of the control prevents operation of the arrangement for delivering the purge fluid and prevents opening of the purge fluid valve.

13. The apparatus of claim 9 wherein:
the supply machine further comprises:
   a cleaning air tank for containing pressurized air; and
the applicator further comprises:
   a cleaning air valve that receives pressurized cleaning air from the cleaning air tank;
   a second nozzle that delivers the pressurized air to clean an area where the bead is to be dispensed.

14. The apparatus of claim 13 wherein the applicator is configured such that the applicator can be operated such as to simultaneously apply the bead of material and deliver the pressurized air.

15. The apparatus of claim 9 wherein the applicator further comprises a manifold having a first material inlet, a first material outlet, and a first valve stem receiver, and wherein the first pneumatically-actuated valve includes a first valve stem, and wherein opening the first valve includes retracting the first valve stem from the first valve stem receiver to allow the first material to flow from the first material inlet to the first material outlet.

16. The apparatus of claim 15 wherein the manifold further comprises a second material inlet, a second material outlet, and a second valve stem receiver, and wherein the second pneumatically-actuated valve includes a second valve stem, and wherein the first valve stem and the second valve stem are operatively coupled to a piston and movement of the piston away from the manifold retracts the first valve stem from the first valve stem receiver and the second valve stem from the second valve stem receiver to allow the first material to flow from the first material inlet to the first material outlet and the material to flow from the second material inlet to the second material outlet.

* * * * *